(12) United States Patent
Shimomura et al.

(10) Patent No.: US 10,106,140 B2
(45) Date of Patent: Oct. 23, 2018

(54) SPRING BRAKE CHAMBER

(71) Applicant: NABTESCO AUTOMOTIVE CORPORATION, Tokyo (JP)

(72) Inventors: Takeo Shimomura, Tokyo (JP); Akinori Nishimura, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

(21) Appl. No.: 14/439,035

(22) PCT Filed: Nov. 5, 2013

(86) PCT No.: PCT/JP2013/079929
§ 371 (c)(1),
(2) Date: Apr. 28, 2015

(87) PCT Pub. No.: WO2014/069663
PCT Pub. Date: May 8, 2014

(65) Prior Publication Data
US 2015/0246667 A1 Sep. 3, 2015

(30) Foreign Application Priority Data

Nov. 5, 2012 (JP) .................................. 2012-243936
Nov. 5, 2012 (JP) .................................. 2012-243937
Nov. 5, 2012 (JP) .................................. 2012-243938

(51) Int. Cl.
*B60T 17/08* (2006.01)
*F16D 65/28* (2006.01)
(Continued)

(52) U.S. Cl.
CPC .......... *B60T 17/085* (2013.01); *B60T 17/083* (2013.01); *B60T 17/086* (2013.01); *B60T 17/088* (2013.01);
(Continued)

(58) Field of Classification Search
CPC ........ B60T 17/083; B60T 17/06; B60T 17/10; B60T 11/00; B60T 17/085; B60T 17/086;
(Continued)

(56) References Cited

U.S. PATENT DOCUMENTS 3,712,181 A 1/1973 Swander, Jr. et al.
3,911,795 A * 10/1975 Gibbons ............... B60T 17/083
92/159

(Continued)

FOREIGN PATENT DOCUMENTS

CN 102159437 A 8/2011
CN 102177058 A 9/2011
(Continued)

OTHER PUBLICATIONS

Englished machined translation of GB-2144803, Description only, Mar. 13, 1985.*
(Continued)

*Primary Examiner* — Robert A. Siconolfi
*Assistant Examiner* — San M Aung
(74) *Attorney, Agent, or Firm* — Pillsbury Winthrop Shaw Pittman, LLP

(57) ABSTRACT

A spring brake chamber includes a first case, a second case, and a coupling case. The first case includes an open end, a closed end, and an open end portion. The open end portion of the first case includes a tapered outer positioning portion having a diameter that increases toward the open end. The coupling case couples the first case and the second case. The coupling case includes an open end closer to the first case and an open end portion. The open end portion of the coupling case includes a tapered inner positioning portion having a diameter that decreases toward the open end. The (Continued)

first case is positioned relative to the coupling case by attaching the outer positioning portion to an outer side of the inner positioning portion.

17 Claims, 12 Drawing Sheets

(51) Int. Cl.
| | | |
|---|---|---|
| *F16J 15/56* | (2006.01) | |
| *F16D 121/08* | (2012.01) | |
| *F16D 123/00* | (2012.01) | |
| *F16D 127/04* | (2012.01) | |
| *F16D 121/06* | (2012.01) | |

(52) U.S. Cl.
CPC .............. *F16D 65/28* (2013.01); *F16J 15/56* (2013.01); *F16D 2121/06* (2013.01); *F16D 2121/08* (2013.01); *F16D 2123/00* (2013.01); *F16D 2127/04* (2013.01)

(58) Field of Classification Search
CPC ........ B60T 17/088; B60T 13/26; B60T 13/38; F16D 2121/02; F16D 2121/12; F16D 2123/00; F16D 2121/06; F16D 2121/08; F16D 2121/10; F16D 2127/04; F16J 15/56; Y10T 29/49826
USPC ........................................................ 188/166
See application file for complete search history.

(56) References Cited

U.S. PATENT DOCUMENTS

| | | | | |
|---|---|---|---|---|
| 4,480,531 A | * | 11/1984 | Mylius | B60T 17/086 92/129 |
| 4,893,844 A | | 1/1990 | Chelette et al. | |
| 5,353,688 A | * | 10/1994 | Pierce | B60T 17/085 188/170 |
| 5,640,894 A | * | 6/1997 | Zarybnicky, Sr. | B60T 17/083 29/888.06 |
| 5,676,036 A | * | 10/1997 | Choinski | B60T 17/083 92/128 |
| 6,477,939 B1 | * | 11/2002 | Siebke | B60T 17/083 92/130 R |
| 2007/0131498 A1 | * | 6/2007 | Li | B60T 17/083 188/166 |
| 2008/0116741 A1 | * | 5/2008 | Brandt | B60T 17/083 303/87 |
| 2010/0095836 A1 | * | 4/2010 | Fisher | B60T 17/083 92/63 |
| 2011/0209953 A1 | | 9/2011 | Fantazi et al. | |
| 2011/0247907 A1 | | 10/2011 | Herges et al. | |
| 2012/0247880 A1 | * | 10/2012 | Bradford | B60T 17/083 188/151 R |
| 2013/0239799 A1 | * | 9/2013 | Bradford | B60T 17/086 92/63 |
| 2014/0096678 A1 | * | 4/2014 | Shimomura | B60T 17/083 92/96 |

FOREIGN PATENT DOCUMENTS

| | | | | |
|---|---|---|---|---|
| CN | 102245451 A | | 11/2011 | |
| EP | 542568 A2 | * | 5/1993 | |
| EP | 0542568 A2 | | 5/1993 | |
| EP | 2 514 648 A1 | | 10/2012 | |
| GB | 2144803 A | * | 3/1985 | ............ B60T 17/083 |
| JP | 59-208289 A | | 11/1984 | |
| JP | 2006-123873 A | | 5/2006 | |
| JP | 2011-085227 A | | 4/2011 | |
| JP | 2012-087870 A | | 5/2012 | |
| WO | 03/080418 A1 | | 10/2003 | |
| WO | WO 2009/075659 A2 | | 6/2009 | |
| WO | WO 2012/141341 A2 | | 10/2012 | |

OTHER PUBLICATIONS

International Search Report as issued in International Patent Application No. PCT/JP2013/079929, dated Feb. 10, 2014.
First Office Action as issued in Chinese Patent Application No. 201380056873.8, dated Jul. 26, 2016.
Extended European Search Report as issued in European Patent Application No. 13850303.2, dated Jul. 11, 2016.
International Preliminary Report on Patentability as issued in International Patent Application No. PCT/JP2013/079929, dated May 5, 2015.
Notification of Reasons for Refusal Japanese Patent Application No. 2016-215651 dated Sep. 19, 2017 with English translation.
Communication pursuant to Article 94(3) EPC EP Application No. 13850303.2 dated Feb. 20, 2018.

* cited by examiner

SPRING BRAKE CHAMBER

CROSS-REFERENCE TO RELATED APPLICATIONS

This application is the U.S. National Stage of PCT/JP2013/079929, filed Nov. 5, 2013, which in turn claims priority to Japanese Patent Application Nos. JP 2012-243936, filed Nov. 5, 2012, JP 2012-243937, filed Nov. 5, 2012, and JP 2012-243938, filed Nov. 5, 2012. The contents of all of these applications are incorporated herein by reference in their entireties.

TECHNICAL FIELD

The present invention relates to a spring brake chamber.

BACKGROUND ART

A spring brake chamber is adopted as a drive device in a brake device of a large vehicle such as a bus, truck, trailer, and the like (refer to, for example, patent documents 1 and 2).

The spring brake chamber includes a cylindrical primary chamber and a cylindrical secondary chamber, which is coupled to the primary chamber. The two ends of the primary chamber are closed. One end of the secondary chamber is open, and the other end is closed. One end of the secondary chamber, that is, the end of the secondary chamber opposite to an end closer to the primary chamber, includes a cylindrical rod insertion portion, into which a second push rod is inserted.

The spring brake chamber includes a cylindrical first case forming the primary chamber, a cylindrical second case forming the secondary chamber, and a coupling case that forms the primary chamber in cooperation with the first case and forms the secondary chamber in cooperation with the second case. The first case includes an open end and a closed end. The two ends of the second case are both open. The coupling case, which has an I-shaped cross-section, forms the primary chamber by closing the first case and forms the secondary chamber by closing the second case. The first case and the coupling case are fixed together when clamped by a clamp ring or when the open end of the first case is crimped. Furthermore, the second case and the coupling case are clamped and fixed by a clamp ring or when the open end of the second case is crimped.

A cylindrical first piston is accommodated in the primary chamber so as to be movable in the axial direction. The first piston includes an open end and a closed end. A compression spring that biases the first piston toward the secondary chamber is arranged in the primary chamber. The first piston partitions the primary chamber into two compartments, namely, a spring compartment that accommodates the compression spring and a first control compartment that is closer to the coupling case. A first push rod, which extends through the coupling case, is fixed to the first piston. Thus, the first push rod is movable back and forth in the axial direction integrally with the first piston. A diaphragm is arranged in the secondary chamber to partition the secondary chamber into two compartments, namely, a second control compartment that is closer to the coupling case and a piston compartment that accommodates a second piston rod. The entire circumference of the diaphragm is fixed to an inner wall of the secondary chamber. A second piston is arranged in a space closer to the rod insertion portion in the secondary chamber. The second piston moves in the rod insertion portion integrally with the diaphragm when the diaphragm moves. The second piston includes a disc, which is attached to the diaphragm, and a bar-shaped second push rod, which moves in the rod insertion portion.

A wedge that extends a brake shoe of a brake drum is connected to the distal end of the second piston. In the spring brake chamber, compressed air is supplied to at least one of the first control compartment of the primary chamber and the second control compartment of the secondary chamber to drive the wedge and apply the brake.

PRIOR ART DOCUMENT

Patent Document

Patent document 1: Japanese Laid-Open Patent Publication NO. 2012-87870
Patent document 2: Japanese Laid-Open Patent Publication No. 2011-85227

SUMMARY OF THE INVENTION

The spring brake chamber is formed from a material having strength or has a thick wall to avoid breakage when excessive pressure acts in the primary chamber due to insufficient pressure regulation of the compressed air. This, however, increases cost and weight. Thus, there is a demand for a spring brake chamber that can obviate breakage even when excessive pressure is applied to the interior of the primary chamber without increasing cost and weight.

A first object of the present invention is to provide a spring brake chamber that obviates breakage even when excessively large pressure acts in the primary chamber without increasing cost and mass.

The first case of the spring brake chamber described in patent document 2 is formed through forging. A female thread component is fixed to the closed end of the first case. The female thread component is used to rotate a release bolt and move the first push rod to a non-application position when the first push rod cannot be moved, such as when the first push rod cannot be moved in the normal manner due to a system failure. The female thread component needs to have strength since a compression spring is arranged on an inner bottom surface of the first case. Further, a separate spring seat is provided for the compression spring. Thus, there is a demand for a spring brake chamber that reduces the number of components.

A second object of the present invention is to provide a spring brake chamber that reduces the number of components.

In the spring brake chamber of patent document 1, a ring-shaped piston cup is mounted on an outer circumference of the first piston so that the first piston moves in the primary chamber while maintaining a hermetic state. The piston cup is formed from an elastic material such as rubber or the like to maintain the seal. A sealing member is arranged in a through hole of the coupling case, through which the first push rod extends. The sealing member is formed from an elastic material such as rubber to maintain the hermetic state. The direction of a biasing force applied to the first piston from the compression spring does not coincide with the axial direction of the primary chamber due to the winding of the compression spring. Thus, a lateral force perpendicular to the axial direction of the primary chamber may act on the first piston. In this case, the lateral force that acts on the piston cup and the first push rod increases the slide resistance. This accelerates wear of the piston cup and the rubber sealing member and hinders smooth movement. A spring brake chamber that can smoothly slide even if the lateral force of the compression spring is acted is thus desired.

A third object of the present invention is to provide a spring brake chamber that allows for smooth movement of the first piston even when the lateral force of the compression spring acts on the first piston.

To achieve the first object, one aspect of the present invention is a spring brake chamber including a cylindrical first case, a cylindrical second case, and a coupling case. The first case forms a primary chamber. The first case includes an open end, a closed end located at a side opposite to the open end, and an open end portion located proximal to the open end. The open end portion includes a tapered outer positioning portion having a diameter that increases toward the open end. The cylindrical second case forms a secondary chamber. The coupling case couples the first case and the second case. The coupling case includes an open end closer to the first case and an open end portion located proximal to the open end. The open end portion includes a tapered inner positioning portion having a diameter that decreases toward the open end. The first case is positioned relative to the coupling case by attaching the outer positioning portion to an outer side of the inner positioning portion.

To achieve the second object, a second aspect of the present invention is a spring brake chamber including a cylindrical first case, a first piston, a compression spring, a cylindrical second case, a second piston, a coupling case, a push rod, a threaded portion, and a release bolt. The first case forms a primary chamber. The first case includes an open end and a closed end located at a side opposite to the open end. The first piston is accommodated in the primary chamber. The compression spring has a biasing force that biases the first piston. The second case forms a secondary chamber. The second piston is accommodated in the secondary chamber and moved by a supply of compressed air. The coupling case couples the first case and the second case. The coupling case includes a communication hole. The push road is arranged in the first piston and inserted into the communication hole. The push rod holds the second piston when biased by the compression spring. The threaded portion is arranged in the closed end of the first case. The release bolt is inserted through the threaded portion. The release bolt is rotated in the threaded portion to mechanically move the push rod to a brake non-application position when movement of the push rod through a normal operation is disabled. The first case is formed through forging. The closed end and the threaded portion are formed integrally with each other.

To achieve the third object, a third aspect of the present invention is a spring brake chamber including a primary chamber, a first piston, a compression spring, a secondary chamber, a second piston, a coupling unit, a push rod, a first sealing member, and a first guide member. The first piston is accommodated in the primary chamber. The compression spring has a biasing force that biases the first piston. The second piston is accommodated in the secondary chamber and moved by a supply of compressed air. The coupling unit couples the primary chamber and the secondary chamber. The coupling unit includes a circumferential wall that defines a communication hole. The push rod is arranged in the first piston and inserted through the communication hole. The push rod holds the second piston when biased by the compression spring. The first sealing member is arranged between the push rod and the circumferential wall of the communication hole. The first guide member is arranged proximal to the first sealing member to guide movement of the push rod. The first guide member is formed from a harder material than the first sealing member.

DETAILED DESCRIPTION OF THE PREFERRED EMBODIMENTS

A first embodiment of a spring brake chamber will now be described with reference to FIGS. 1 to 5.

Figure 1:
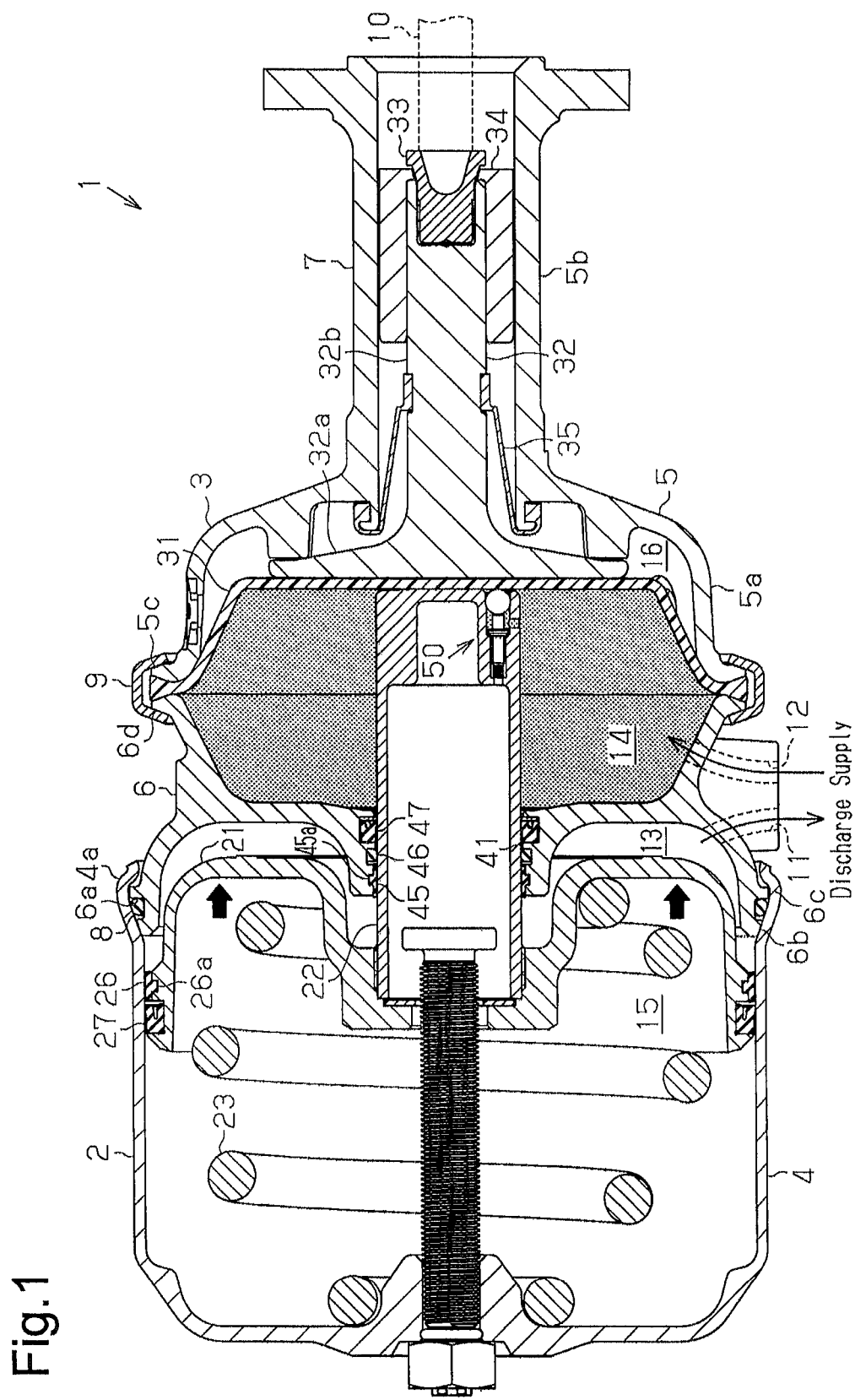
FIG. 1 is a cross-sectional view showing a spring brake chamber according to a first embodiment of the present invention when used with a parking brake.
Figure 2:
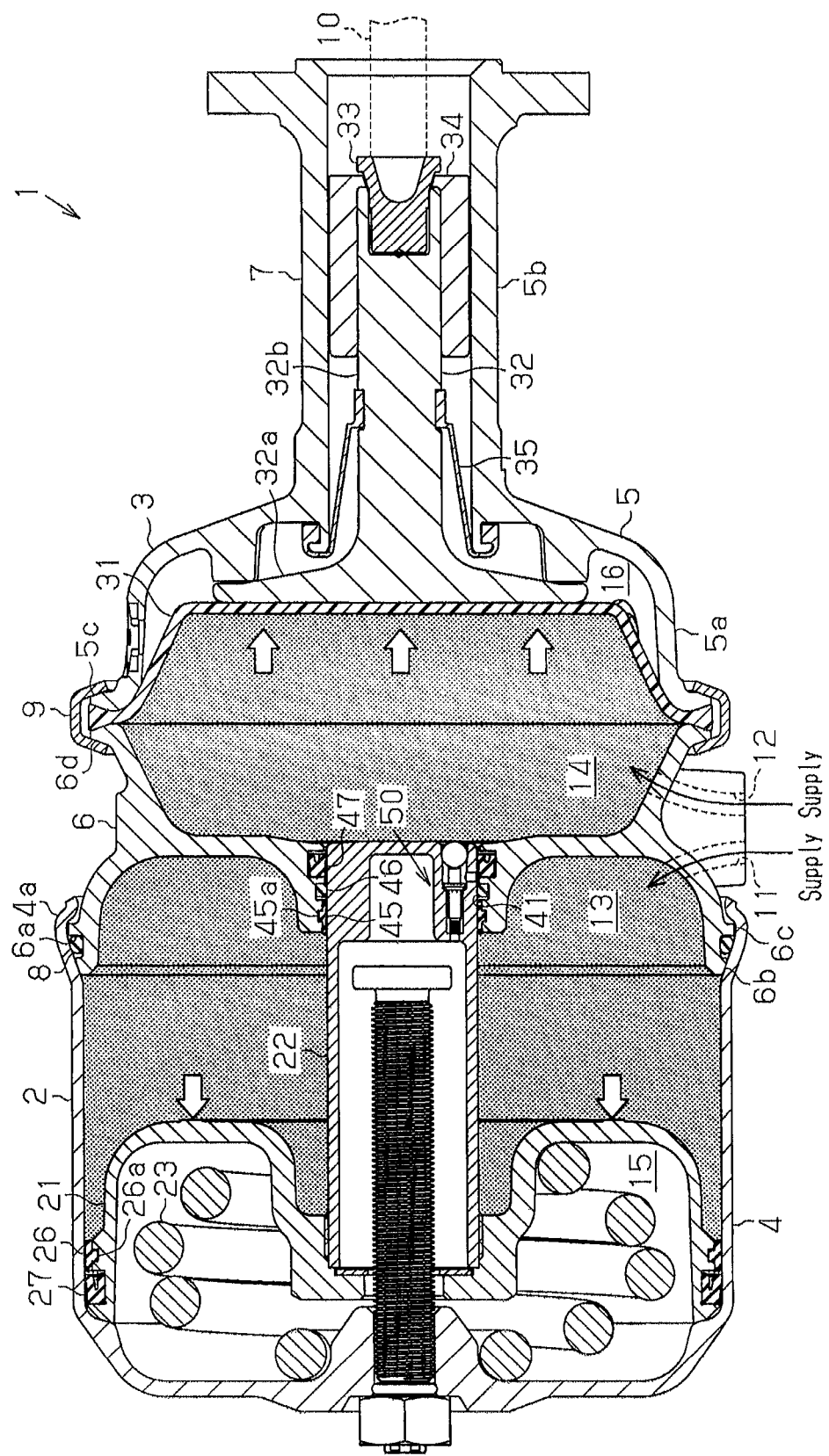
FIG. 2 is a cross-sectional view showing the spring brake chamber when used with a foot brake.
Figure 3:
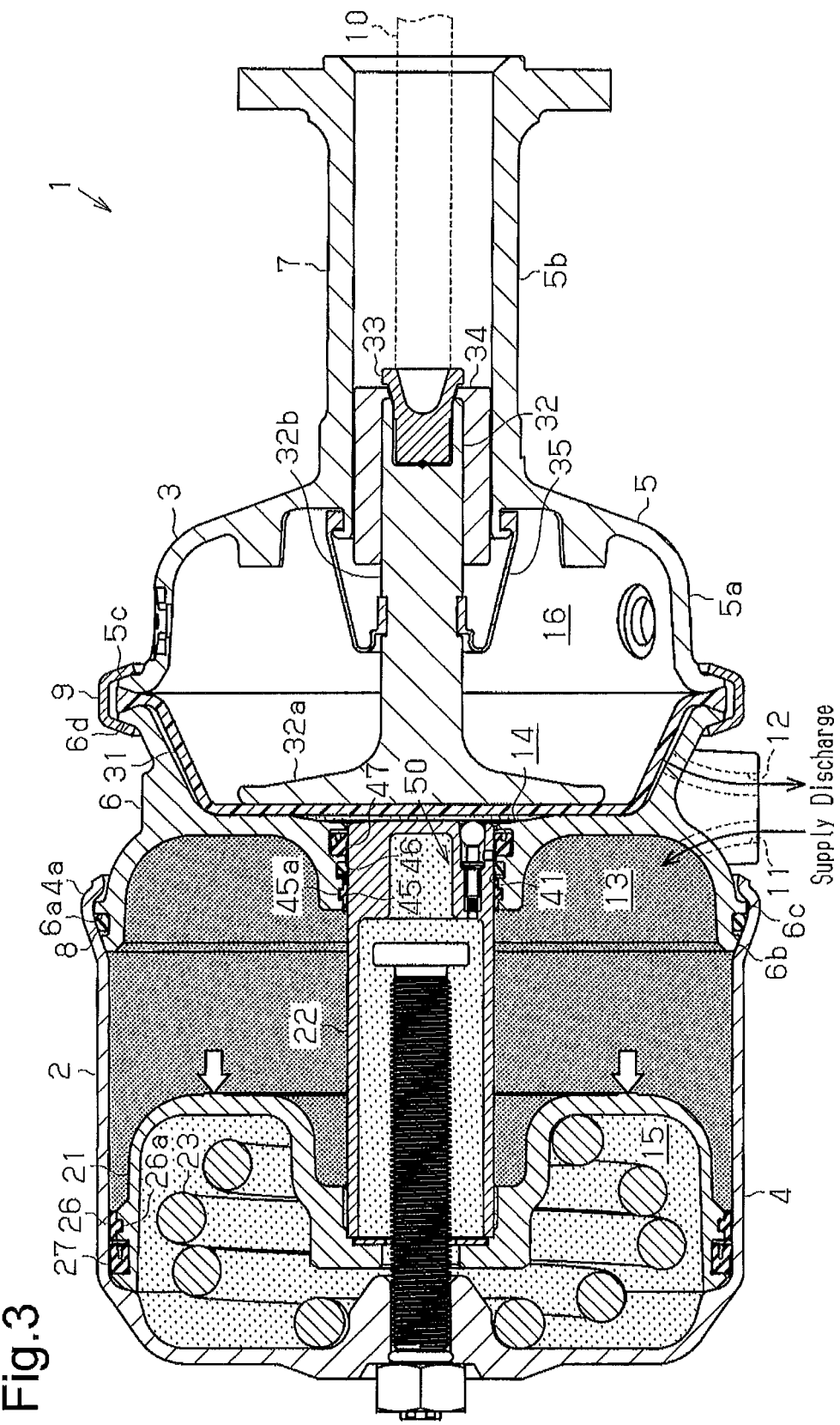
FIG. 3 is a cross-sectional view showing the spring brake chamber when the brake is released.

As shown in FIGS. 1 to 3, a spring brake chamber 1 includes a cylindrical primary chamber 2 (piggyback) and a cylindrical secondary chamber 3 (service chamber), which is coupled to the primary chamber 2. The two ends of the primary chamber 2 are closed. One end of the secondary chamber 3 is open, and the other end is closed. One end of the secondary chamber 3, that is, the end opposite to the end closer to the primary chamber 2 in the secondary chamber 3 includes a cylindrical rod insertion portion 7 into which a second push rod 33 is inserted.

The spring brake chamber 1 includes a cylindrical first case 4 forming the primary chamber 2, a cylindrical second case 5 forming the secondary chamber 3, and a coupling case 6 serving as a coupling unit that forms the primary chamber 2 in cooperation with the first case 4 and forms the secondary chamber 3 in cooperation with the second case 5. The first case 4 includes an open end, a closed end located at the opposite side of the open end, and an open end portion 4a located proximal to the open end. The two ends of the second case 5 are both open. The coupling case 6, which has an I-shaped cross-section, includes an open end closer to the first case 4, and an open end portion (hereinafter referred to as the open end portion of the coupling case 6) located proximal to the open end. The coupling case 6 forms the primary chamber 2 by closing the first case 4 and forms the secondary chamber 3 by closing the second case 5. The second case 5 includes a large diameter portion 5a forming the secondary chamber 3 and a small diameter portion 5b forming the rod insertion portion 7.

An outer surface of the open end portion of the coupling case 6 includes a recess 6a that receives an O-ring 8 having an O-shaped cross-section serving as a seal member. The recess 6a, which is a holding portion formed by two protrusions 6b and 6c, is formed over the entire circumference of the outer surface of the coupling case 6. The open end portion 4a of the first case 4 is crimped with one end of the coupling case 6 contacting the inner side of the open end portion 4a of the first case 4. This connects the first case 4 and the coupling case 6.

The end of the second case 5 closer to the coupling case 6A includes a rib 5c, and the end of the coupling case 6 closer to the second case 5 includes a rib 6d. The rib 5c of the second case 5 and the rib 6d of the coupling case 6 are clamped and fixed by a clamp ring 9.

The coupling case 6 includes a primary port 11 through which compressed air flows to and from the primary chamber 2. A primary port valve (not shown), which controls the outward and inward flow of the compressed air, is connected to the primary port 11. The compressed air is supplied from the primary port 11 to the primary chamber 2 by the primary port valve, and the air is discharged from the primary port 11 by the primary port valve.

The coupling case 6 also includes a secondary port 12 through which compressed air flows to and from the secondary chamber 3. A secondary port valve (not shown), which controls the outward and inward flow of the compressed air, is connected to the secondary port 12. The compressed air is supplied from the secondary port 12 to the secondary chamber 3 by the secondary port valve, and the air is discharged from the secondary port 12 by the secondary port valve.

A cylindrical first piston 21 is accommodated in the primary chamber 2 so as to be movable in the axial direction. The first piston 21 has an open end and a closed end. The first piston 21 partitions the primary chamber 2 into two compartments, namely, a spring compartment 15 that accommodates a compression spring 23 and a first control compartment 13 that is closer to the coupling case 6. A cylindrical first push rod 22 is fixed to the first piston 21 so as to be movable back and forth in the axial direction integrally with the first piston 21. The first push rod 22 is inserted into a communication hole 41 of the coupling case 6. The first push rod 22 has a hollow interior. A circulating mechanism 50, which circulates the air of the spring compartment 15 to a second control compartment 14 in the secondary chamber 3, is arranged in the first push rod 22. The compression spring 23 arranged in the primary chamber 2 biases the first piston 21 toward the secondary chamber 3.

A diaphragm 31 is arranged in the secondary chamber 3 to partition the secondary chamber 3 into two compartments, namely, the second control compartment 14 that is located at the side of the coupling case 6 and the piston compartment 16 that accommodates a second piston 32. The entire circumference of the diaphragm 31 is held between the rib 5c of the second case 5 and the rib 6d of the coupling case 6, and fixed to the inner wall of the secondary chamber 3. The diaphragm 31, which is a film formed from an elastic material, moves in the secondary chamber 3 when deformed by the compressed air supplied to the secondary chamber 3. The second piston 32, which moves in the rod insertion portion 7 integrally with the diaphragm 31, is arranged in the secondary chamber 3. The second piston 32 includes a disk 32a attached to the diaphragm 31 and a bar-shaped portion 32b that moves in the rod insertion portion 7. A cylindrical groove is formed in the end of the bar-shaped portion 32b. The cylindrical groove receives the bar-shaped second push rod 33. A cylindrical rod guide 34 that guides the second piston 32 so as to be movable in the rod insertion portion 7 is arranged on the distal end of the second piston 32. A cylindrical dust cover 35 is attached to the second piston 32 and the second case 5. One end of the dust cover 35 is fixed to the side surface of the second piston 32, and the other end of the dust cover 35 is fixed to the inner wall of the second case 5.

A wedge 10, which extends the brake shoe of a brake drum, is connected to the distal end of the second push rod 33. The spring brake chamber 1 supplies at least one of the first control compartment 13 of the primary chamber 2 and the second control compartment 14 of the secondary chamber 3 with compressed air to drive the wedge 10 and apply a brake.

A first guide member 45, which is formed from a resin and guides the movement of the first push rod 22, a D-ring 46, which is formed from rubber and seals the gap between the communication hole 41 and the first push rod 22, and a first C-ring 47, which is formed from rubber and has a C-shaped cross-section that restricts the flow of air from the second control compartment 14 of the secondary chamber 3 to the first control compartment 13 of the primary chamber 2, are arranged on the inner wall (circumferential wall) defining the communication hole 41 of the coupling case 6 in order from the primary chamber side. The first C-ring 47 has an opening with a C-shaped cross-section that opens toward the secondary chamber 3.

The first guide member 45 is arranged at the primary chamber side of the first C-ring 47. This minimizes the amount of grease applied to the outer wall of the first push rod 22 that is removed by the inner wall end of the communication hole 41 when the first push rod 22 moves along the inner wall of the communication hole 41 in the coupling case 6. Furthermore, an area where grease is stored is provided between the first guide member 45 and the first C-ring 47 so that the stored greased may be re-applied to the entire wall surface when the first push rod 22 moves.

The cross-sectional shape of the first guide member 45 is obtained by combining a cuboid that extends along the side surface of the first push rod 22 and a projection 45a arranged on a portion of the cuboid located at the wall side of the communication hole 41. The projection 45a functions as an engagement projection engaged with the inner wall of the communication hole 41 that serves as a coupling member. The D-ring 46 has a fl-shaped cross-section. The fl-ring 46 seals the primary chamber 2 by having the projecting portion of the D-shape contact the first push rod 22. Unlike an O-ring, it is easy to check for twisting in the fl-ring 46. This obviates twisting when coupling the fl-ring 46. The first C-ring 47 has a shape in which the cross-section is branched into two toward the secondary chamber 3. The first C-ring 47 allows air to flow from the spring compartment 15 of the primary chamber 2 to the second control compartment 14 of the secondary chamber 3, and restricts the flow of air from the second control compartment 14 of the secondary chamber 3 to the spring compartment 15 of the primary chamber 2. The first guide member 45 is formed from a harder material than the first C-ring 47.

A second guide member 26, which is formed from a resin and guides the movement of the first piston 21, and a second C-ring 27, which is formed from rubber and has a C-shaped cross-section for restricting the flow of air from the secondary chamber 3 to the spring compartment 15 accommodating the compression spring 23 in the primary chamber 2, are arranged on the outer circumferential surface of the first piston 21 in order from the secondary chamber side. The second C-ring 27 has an opening with a C-shaped cross-section that opens toward the secondary chamber 3.

The second guide member 26 is arranged on the secondary chamber side of the second C-ring 27. This minimizes the amount of grease applied to the inner wall of the first case 4 that is removed by the second C-ring 27 when the first piston 21 moves along the inner wall of the first case 4. Furthermore, an area where grease is stored is provided between the second guide member 26 and the second C-ring 27 so that the stored greased may be re-applied to the entire wall surface when the first push rod 22 moves.

The cross-section of the second guide member 26 is obtained by combining a cuboid that extends along the side surface of the first piston 21 and a projection 26a arranged on a portion of the cuboid located at the outer circumferential side of the first piston 21. The projection 26a functions as an engagement projection engaged with the outer circumference of the first piston 21 that serves as a coupling member. The second C-ring 27 has a shape in which the cross-section is branched into two toward the secondary chamber 3. The second C-ring 27 allows air to flow from the spring compartment 15 accommodating the compression spring 23 of the primary chamber 2 to the first control compartment 13 of the primary chamber 2, and restricts the flow of air from the first control compartment 13 of the primary chamber 2 to the spring compartment 15 accommodating the compression spring 23. The second guide member 26 is formed from a harder material than the second C-ring 27.

Figure 4:
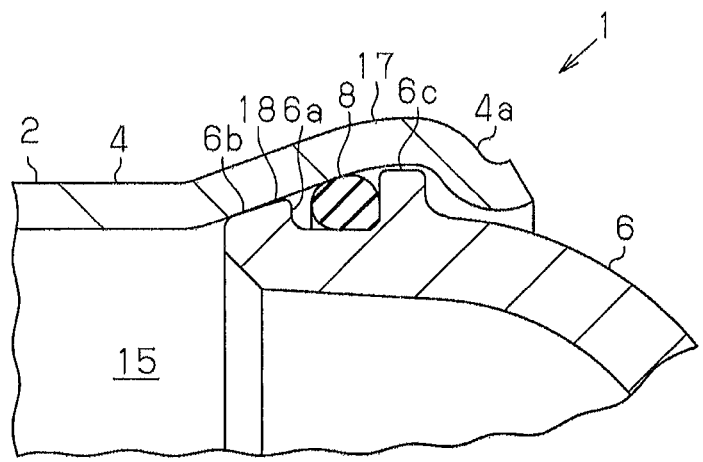
FIG. 4 is an enlarged view of FIG. 1 showing a connecting portion of a first case and a coupling case of the spring brake chamber.

As shown in FIG. 4, the open end portion of the coupling case 6 at the side of the first case 4 includes an inner positioning portion 18 having a tapered shape in which the diameter decreases toward the open end. The outer surface of the open end portion of the coupling case 6 includes a recess 6a, and the recess 6a forms two protrusions 6b and 6c. Therefore, the inner positioning portion 18 having the tapered shape is formed by the distal end portions of the two protrusions 6b and 6c.

The open end portion 4a of the first case 4 includes an outer positioning portion 17 having a tapered shape in which the diameter is increased toward the open end. The outer positioning portion 17 having the tapered shape and the inner positioning portion 18 having the tapered shape are fitted together. This positions the first case 4 relative to the coupling case 6 along the tapered portions and facilitates the positioning of the coupling case 6 and the first case 4. The outer positioning portion 17 of the first case 4 is then arranged on the outer side of the inner positioning portion 18 of the coupling case 6, and the distal end portion of the outer positioning portion 17 is crimped to couple the outer positioning portion 17 to the inner positioning portion 18.

The operation of the spring brake chamber 1 will now be described.

As shown in FIG. 1, when a parking brake is operated and applied, the primary port valve connected to the primary port 11 opens so that compressed air flows out of the primary side. This discharges the compressed air that has been supplied to the first control compartment 13 in the primary chamber 2. Furthermore, when the parking brake is operated and applied, the secondary port valve connected to the secondary port 12 opens so that compressed air flows out of the secondary side. This discharges the compressed air that has been supplied to the second control compartment 14 in the secondary chamber 3. As a result, the first piston 21 is moved toward the secondary chamber 3 by the biasing force of the compression spring 23 and fixed at a parking brake application position. Thus, in the spring brake chamber 1, the first push rod 22 fixed to the first piston 21 pushes the diaphragm 31 in the secondary chamber 3 toward the rod insertion portion 7. This holds the second piston 32 in the state moved toward the rod insertion portion 7. The parking brake remains applied by the wedge 10 held at the brake lock position with the second piston 32.

As shown in FIG. 2, when the parking brake is released and no longer applied, the primary port valve opens so that compressed air flows into the first control compartment 13, thus supplying the compressed air to the first control compartment 13 in the primary chamber 2. The supplied compressed air moves the first piston 21 away from the secondary chamber 3 to a parking brake non-application position. This releases the diaphragm 31 and the second piston 32, which have been fixed.

When a foot brake is operated and applied, the secondary port valve opens to supply compressed air to the second control compartment 14 of the secondary chamber 3. As a result, the diaphragm 31 is moved toward the rod insertion portion 7 by the supplied compressed air. As the diaphragm 31 moves toward the rod insertion portion 7, the second piston 32 moves toward the rod insertion portion 7. This moves the wedge 10 to the brake application position with the second piston 32. In the spring brake chamber 1, the brake application amount is changed in accordance with the amount of compressed air supplied to the secondary chamber 3.

As shown in FIG. 3, when the foot brake is released and no longer applied, the secondary port valve opens so that compressed air flows out of the secondary chamber 3 flows. Thus, compressed air is discharged from the second control compartment 14 in the secondary chamber 3. The diaphragm 31 moves toward the primary chamber 2 when the compressed air is discharged. As the diaphragm 31 moves toward the primary chamber 2, the second piston 32 moves toward the primary chamber 2. Thus, the applied brake is released by moving the wedge 10 away from the brake application position with the second piston 32.

Figure 5:
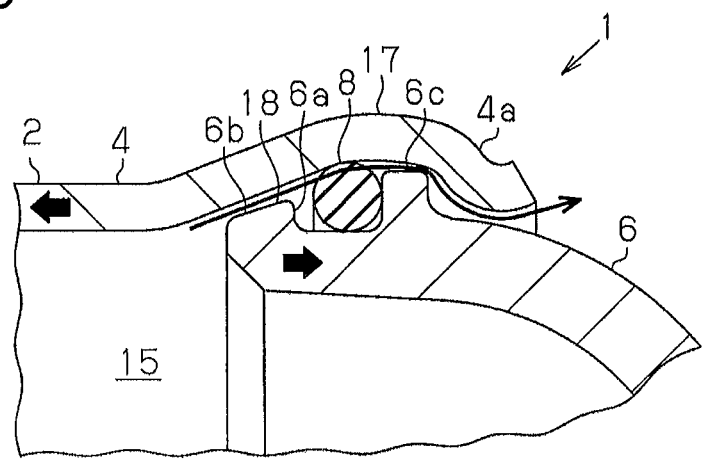
FIG. 5 is an enlarged view of FIG. 1 showing a connecting portion of the first case and the coupling case of the spring brake chamber when excessive pressure acts in the primary chamber.

As shown in FIGS. 2 and 3, compressed air is supplied to the first control compartment in the primary chamber 2 when the parking brake is released. Under this situation, if, for any reason, excessive pressure is applied to the first control compartment in the primary chamber 2 due to insufficient pressure regulation, the coupling case 6 and the first case 4 are moved away from each other as shown in FIG. 5. This forms a gap between the tapered portion of the inner positioning portion 18 and the tapered portion of the outer positioning portion 17. The O-ring 8 between the inner positioning portion 18 and the outer positioning portion 17 has a squeeze that may be easily decreased. Thus, the pressure in the primary chamber 2 can be lowered by discharging compressed air through the gap and the squeeze to avoid breakage of the spring brake chamber 1.

The first embodiment described above has the following advantages.

(1) The inner positioning portion 18, having a tapered shape in the coupling case 6, and the outer positioning portion 17, having a tapered shape in the first case 4, are fitted to each other to couple the coupling case 6 and the first case 4. Thus, if, for any reason, excessive pressure is applied to the first control compartment 13 in the primary chamber 2 due to insufficient pressure regulation, the coupling case 6 and the first case 4 are moved away from each other. This forms a gap forms between the tapered portion of the inner positioning portion 18 of the coupling case 6 and the tapered portion of the outer positioning portion 17 of the first case 4. Compressed air is discharged from the gap to lower the pressure in the primary chamber 2 and obviate breakage of the spring brake chamber 1. Since breakage is obviated by changing the coupled portions of the coupling case 6 and the first case 4, cost and weight increases are avoided that would result from the arrangement of another member.

Furthermore, since the position of the first case 4 relative to the coupling case 6 is determined by the tapered portions, the coupling case 6 and the first case 4 are easily positioned.

(2) A shaft seal structure is located between the inner positioning portion 18 of the coupling case 6 and the outer positioning portion 17 of the first case 4. Thus, if, for any reason, excessive pressure is applied to the first control compartment 13 in the primary chamber 2 due to insufficient pressure regulation, the coupling case 6 and the first case 4 move away from each other. This forms a gap between the tapered portion of the inner positioning portion 18 and the tapered portion of the outer positioning portion 17, and easily decreases the squeeze. Thus, the pressure in the primary chamber 2 can be lowered by discharging compressed air through the decreased squeeze to avoid breakage of the spring brake chamber 1.

(3) The outer positioning portion 17 is coupled to the inner positioning portion 18 by crimping the distal end portion of the outer positioning portion 17 of the first case 4. Thus, the coupling case 6 and the first case 4 are coupled without using a coupling member such as a clamp ring. This reduces the number of components.

The first embodiment may be modified as described below to implement the present invention.

In the first embodiment, the inner positioning portion 18 having a tapered shape is formed by the distal end portions of the protrusions 6b and 6c, which form the recess 6a serving as a holding portion for holding the O-ring 8. However, the open end portion of the coupling case 6 does not need to have a tapered shape.

In the first embodiment, the first case 4 is coupled to the coupling case 6. Then, the open end portion 4a of the first case 4 is crimped to couple the first case 4 to the coupling case 6. Instead, the first case 4 may be coupled to the coupling case 6. Then, the first case 4 may be coupled to the coupling case 6 with another member such as a clamp ring or the like.

In the first embodiment, the O-ring 8 is used as a sealing member that is optimal for a shaft seal structure. However, the sealing member is not limited to the O-ring 8. For example, the cross-sectional shape of the sealing member does not have to be O-shaped, and may be a D-shaped. Furthermore, a surface seal may be used for the shaft seal structure. In short, the squeeze merely needs to be easily lowered when a gap is formed between the tapered portion of the inner positioning portion 18 and the tapered portion of the outer positioning portion 17.

A second embodiment of the spring brake chamber will be described below with reference to FIGS. 6 to 8.

Figure 6:
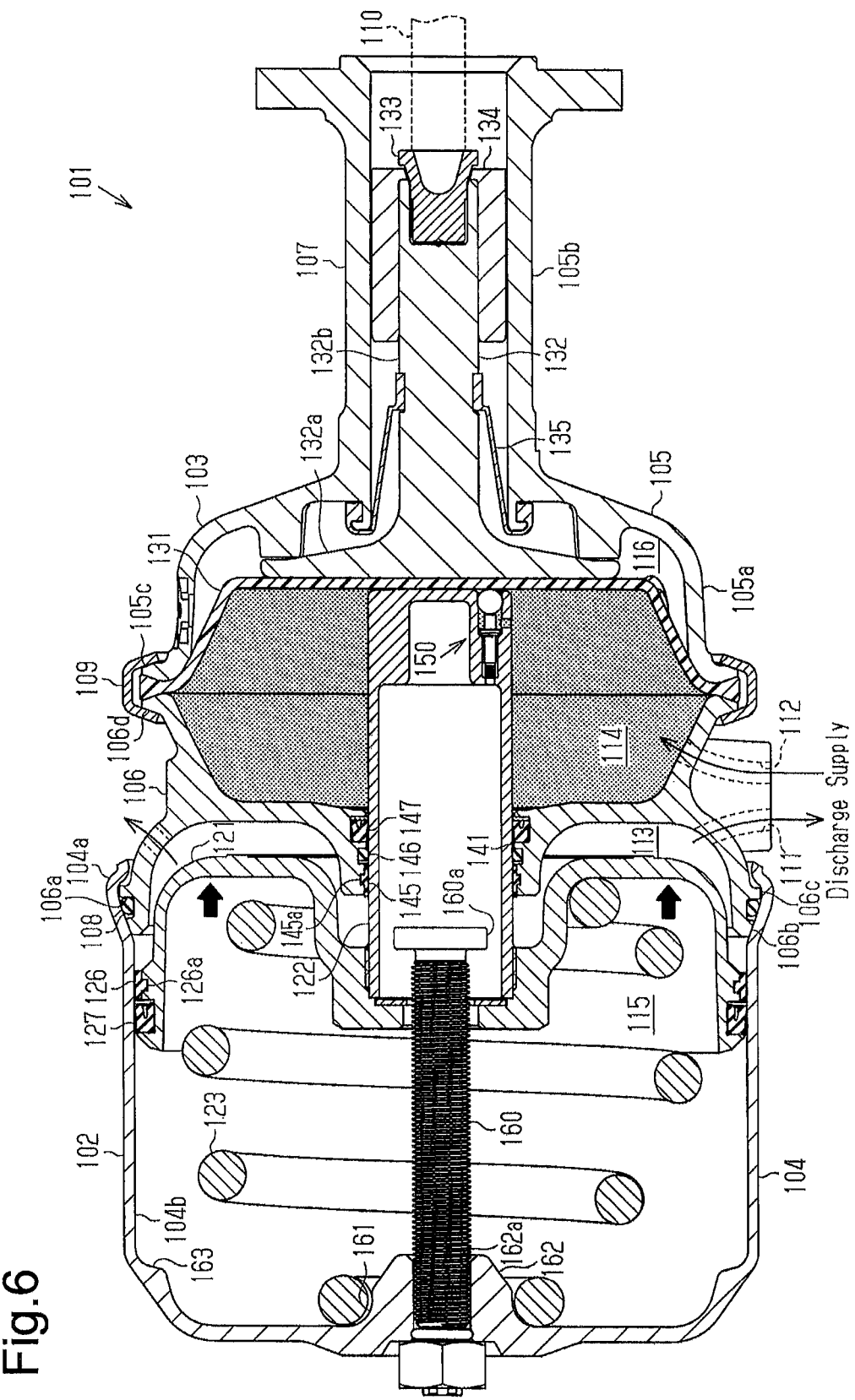
FIG. 6 is a cross-sectional view showing a spring brake chamber according to a second embodiment of the present invention when used with a parking brake.
Figure 7:
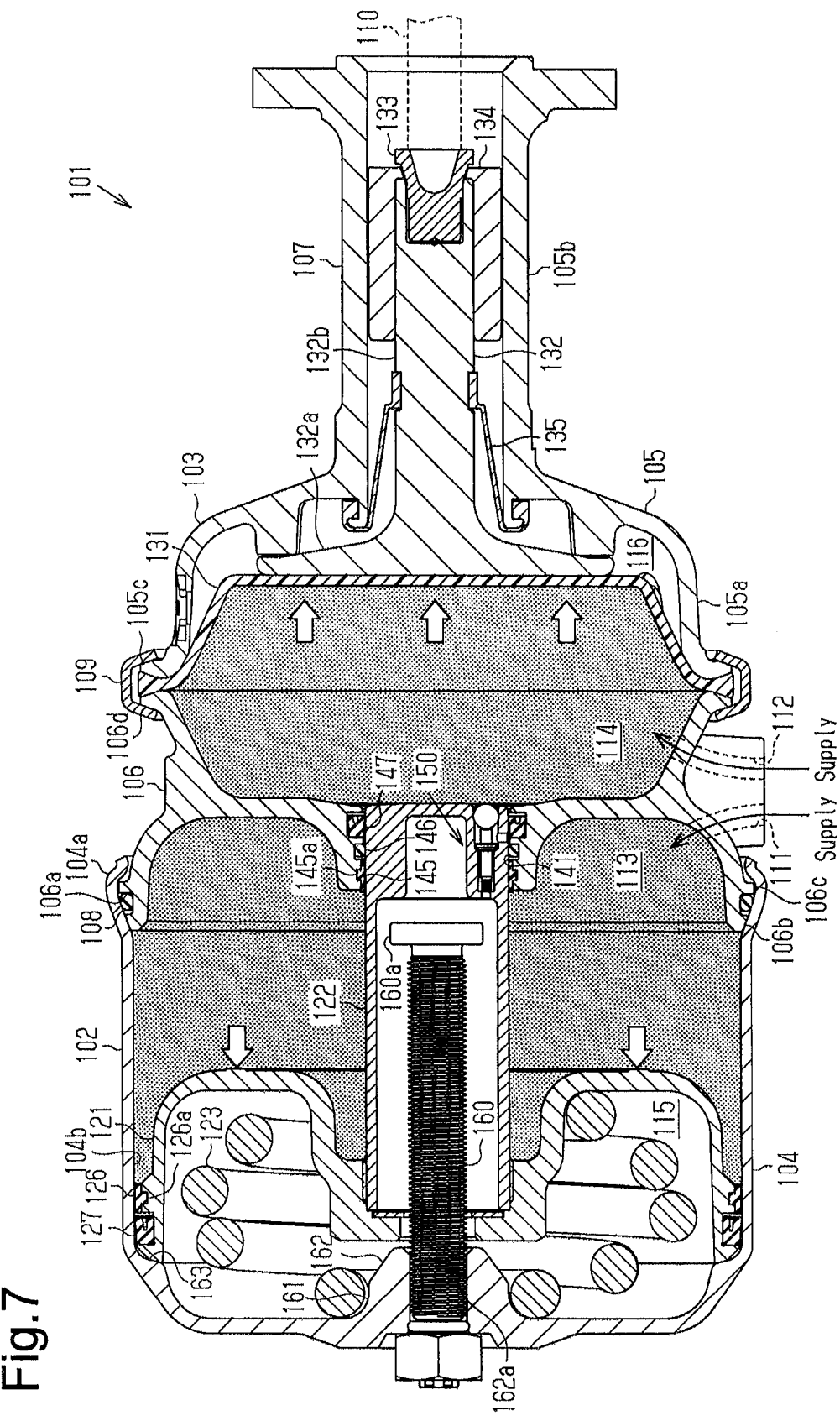
FIG. 7 is a cross-sectional view showing the spring brake chamber when used with a foot brake.
Figure 8:
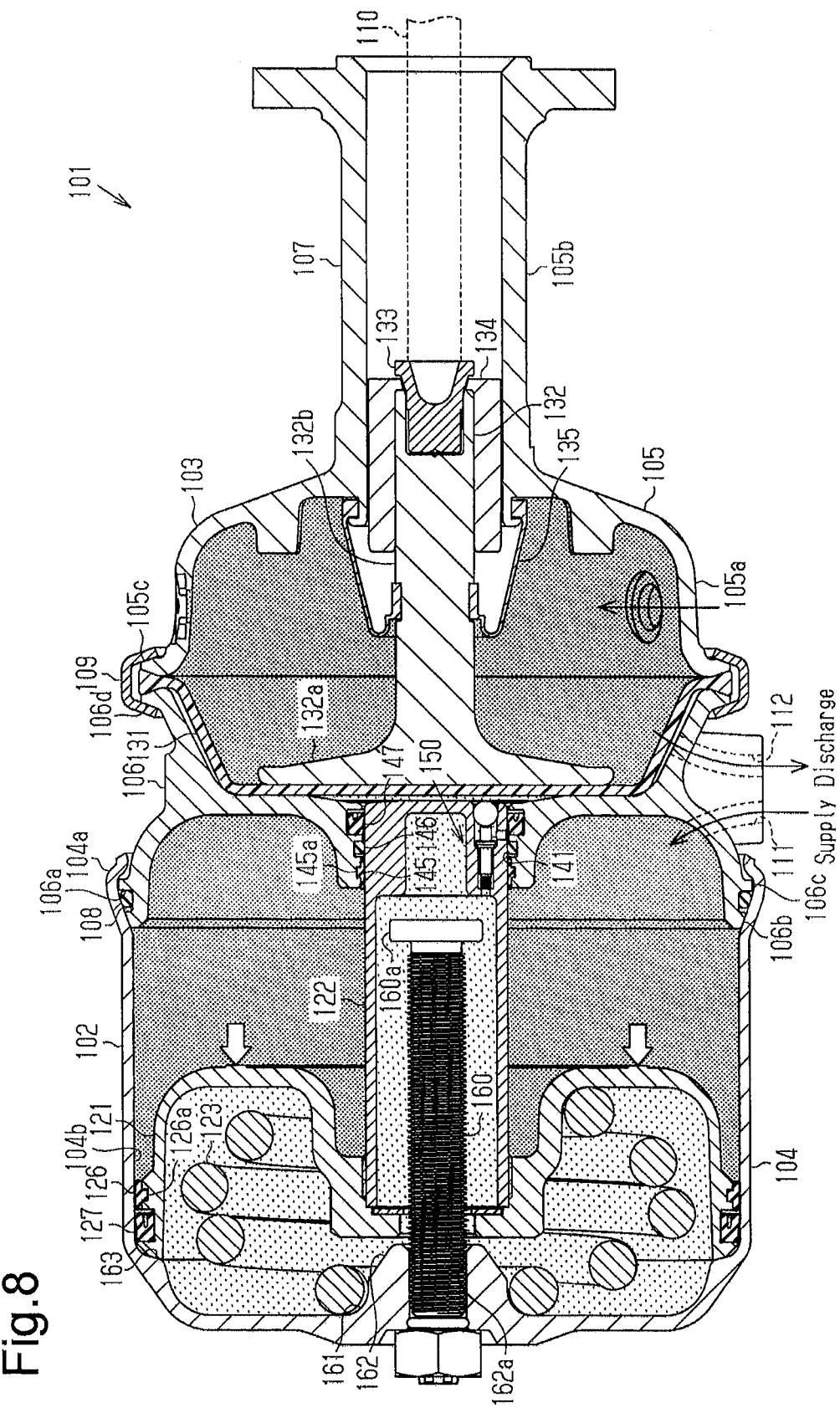
FIG. 8 is a cross-sectional view showing the spring brake chamber when the brake is released.

As shown in FIGS. 6 to 8, a spring brake chamber 101 includes a cylindrical primary chamber 102 (piggyback) and a cylindrical secondary chamber 103 (service chamber), which is coupled to the primary chamber 102. The primary chamber 102 includes two closed ends. One end of the secondary chamber 103 is open, and the other end is closed. One end of the secondary chamber 103, that is, the end opposite to the end closer to the primary chamber 102 in the secondary chamber 103, includes a cylindrical rod insertion portion 107 into which a second push rod 133 is inserted.

The spring brake chamber 101 includes a cylindrical first case 104 forming the primary chamber 102, a cylindrical second case 105 forming the secondary chamber 103, and a coupling case 106 serving as a coupling unit that forms the primary chamber 102 in cooperation with the first case 104 and forms the secondary chamber 103 in cooperation with the second case 105. The first case 104 includes an open end, a closed end located at the opposite side of the open end, and an open end portion 104a located proximal to the open end. The second case 105 has two open ends. The coupling case 106, which has an I-shaped cross-section, includes an open end closer to the first case 104, and an open end portion (hereinafter referred to as the open end portion of the coupling case 106) located proximal to the open end. The coupling case 106 forms the primary chamber 102 by closing the first case 104 and forms the secondary chamber 103 by closing the second case 105. The second case 105 includes a large diameter portion 105a forming the secondary chamber 103 and a small diameter portion 105b forming the rod insertion portion 107.

An outer surface of the open end portion of the coupling case 106 includes a recess 106a that receives an O-ring 108 having an O-shaped cross-section and serving as a seal member. The recess 106a is a holding portion formed by two protrusions 106b and 106c, and is formed over the entire circumference of the outer surface of the coupling case 106. The open end portion 104a of the first case 104 is crimped, with one end of the coupling case 106 contacting the open end portion 104a of the first case 104. This connects the first case 104 and the coupling case 106.

The end closer to the coupling case 106 of the second case 105 includes a rib 105c and the end closer to the second case 105 of the coupling case 106 includes a rib 106d. The rib 105c of the second case 105 and the rib 106d of the coupling case 106 are clamped and fixed by a clamp ring 109.

The coupling case 106 includes a primary port 111 through which the compressed air flows to and from the primary chamber 102. A primary port valve (not shown) that controls the outward and inward flow of compressed air is connected to the primary port 111. The compressed air is supplied from the primary port 111 to the primary chamber 102 by the primary port valve, and the air is discharged from the primary port 111 by the primary port valve.

The coupling case 106 is also formed with a secondary port 112 through which the compressed air flows to and from the secondary chamber 103. A secondary port valve (not shown) that controls the outward and inward flow of compressed air is connected to the secondary port 112. The compressed air is supplied from the secondary port 112 to the secondary chamber 103 by the secondary port valve, and the air is discharged from the secondary port 112 by the secondary port valve.

A cylindrical first piston 121 is accommodated in the primary chamber 102 so as to be movable in the axial direction. The first piston 121 has an open end and a closed end. The first piston 121 partitions the primary chamber 102 into two compartments, namely, a spring compartment 115 that accommodates a compression spring 123 and a first control compartment 113 that is closer to the coupling case 106. A cylindrical first push rod 122 is fixed to the first piston 121 so as to be movable back and forth in the axial direction integrally with the first piston 121. The first push rod 122 is inserted into a communication hole 141 of the coupling case 106. The compression spring 123, which biases the first piston 121 toward the secondary chamber 103, is arranged in the primary chamber 102. The first push rod 122 has a hollow interior. A circulating mechanism 150, which circulates the air of the spring compartment 115 to the second control compartment 114 in the secondary chamber 103, is arranged in the first push rod 122.

A spring coupling portion 161, to which the compression spring 123 is attached, is formed integrally with the middle of the closed end of the first case 104. The spring coupling portion 161 is a projection projecting in the axial direction from the closed end of the first case 104, and has a size that substantially conforms to the inner diameter at the basal end side of the compression spring 123.

A release bolt 160 for forcibly moving the first piston 121 and the first push rod 122 away from the secondary chamber 103 is arranged in the primary chamber 102. A hexagonal head is formed at the basal end of the release bolt 160. The release bolt 160 is inserted into a threaded portion 162 in the closed end of the first case 104. The distal end of the release bolt 160 is inserted into the first push rod 122, and an engagement portion 160a arranged at the distal end of the release bolt 160 is engaged with the first push rod 122. The threaded portion 162, which includes a thread groove 162a, is formed integrally with the middle of the closed end of the first case 104. The threaded portion 162 is arranged in the spring coupling portion 161.

A piston receiving portion 163, which restricts movement of the first piston 121 moving toward the closed end, is formed in the inner side surface 104b of the first case 104 at a portion closer to the closed end. The piston receiving portion 163 projects toward the inner side of the first case 104, and is formed over the entire circumference of the inner side surface of the first case 104. The movement of the first piston 121 is restricted when the open end of the first piston 121 contacts the piston receiving portion 163.

The first case 104 is forged and formed integrally including the spring coupling portion 161, the threaded portion 162, and the piston receiving portion 163. The thread groove 162a of the threaded portion 162 is formed after the forging.

A diaphragm 131 is arranged in the secondary chamber 103 to partition the secondary chamber 103 into two compartments, namely, the second control compartment 114 at the side of the coupling case 106 and the piston compartment 116 accommodating the second piston 132. The entire circumference of the diaphragm 131 is held between the rib 105c of the second case 105 and the rib 106d of the coupling case 106, and fixed to the inner wall of the secondary chamber 103. The diaphragm 131, which is a film formed from an elastic material, moves in the secondary chamber 103 when deformed by the compressed air supplied into the secondary chamber 103. The second piston 132, which moves integrally with the diaphragm 131 in the rod insertion portion 107, is arranged in the secondary chamber 103. The second piston 132 includes a disk 132a attached to the diaphragm 131 and a bar-shaped portion 132b that moves in the rod insertion portion 107. The end of the bar-shaped portion 132b includes a cylindrical groove hole. The bar-shaped second push rod 133 is inserted into the groove hole. A cylindrical rod guide 134 that guides the second piston 132 so as to be movable in the rod insertion portion 107 is arranged on the distal end of the second piston 132. A cylindrical dust cover 135 is attached to the second piston 132 and the second case 105. One end of the second piston 132 is fixed to the side surface of the second push rod 133, and the other end of the dust cover 135 is fixed to the inner wall of the second case 105.

A wedge 110, which extends the brake shoe of the brake drum, is connected to the groove in the distal end of the second push rod 133. The spring brake chamber 101 supplies at least one of the first control compartment 113 of the primary chamber 102 and the second control compartment 114 of the secondary chamber 103 with compressed air to drive the wedge 110 and apply the brake.

A first guide member 145, which is formed from a resin and guides the movement of the first push rod 122, a D-ring 146, which is formed from rubber and seals the gap between the communication hole 141 and the first push rod 122, and a first C-ring 147, which is formed from rubber and restricts the flow of air from the second control compartment 114 of the secondary chamber 103 to the first control compartment 113 of the primary chamber 102, are arranged in the inner wall (circumferential wall) defining the communication hole 141 of the coupling case 106 in order from the primary chamber side. The first C-ring 147 has an opening with a C-shaped cross-section that opens toward the secondary chamber 103.

The first guide member 145 is arranged on the primary chamber side of the first C-ring 147. This minimizes the amount of grease applied to the outer wall of the first push rod 122 that is removed by the inner wall end of the communication hole 141 when the first push rod 122 moves along the inner wall of the communication hole 141 in the coupling case 106. Furthermore, an area where grease is stored is provided between the first guide member 145 and the first C-ring 147 so that the stored greased is re-applied to the entire wall surface when the first push rod 122 moves.

The cross-sectional shape of the first guide member 145 is obtained by combining a cuboid that extends along the side surface of the first push rod 122 and a projection 145a arranged on a portion of the cuboid located at the inner wall side of the communication hole 141. The projection 145a functions as an engagement projection engaged with the inner wall of the communication hole 141 that serves as a coupling member. The D-ring 146 has a D-shaped cross-section. The D-ring 146 seals the primary chamber 102 when the D-shaped projection contacts the first push rod 122. Unlike an O-ring, it is easy to check for twisting in the D-ring 146. This obviates twisting when coupling the D-ring 146. The first C-ring 147 has a shape in which the cross-section is branched into two toward the secondary chamber 103. The first C-ring 147 allows air to flow from the spring compartment 115 of the primary chamber 102 to the second control compartment 114 of the secondary chamber 103, and restricts the flow of air from the second control compartment 114 of the secondary chamber 103 to the spring compartment 115 of the primary chamber 102. The first guide member 145 is formed from a harder material than the first C-ring 147.

A second guide member 126, which is formed from a resin and guides the movement of the first piston 121, and a second C-ring 127, which is formed from rubber and has a C-shaped cross-section for restricting the flow of air from the secondary chamber 103 to the spring compartment 115 accommodating the compression spring 123 in the primary chamber 102, are arranged on the outer circumferential surface of the first piston 121 in order from the secondary chamber side. The second C-ring 127 has an opening with a C-shaped cross-section that opens toward the secondary chamber 103.

The second guide member 126 is arranged on the secondary chamber side of the second C-ring 127. This minimizes the amount of grease applied to the inner wall of the first case 104 that is removed by the second C-ring 127 when the first piston 121 moves along the inner wall of the first case 104. Furthermore, an area where grease is stored is provided between the second guide member 126 and the second C-ring 127 so that the stored greased is re-applied to the entire wall surface when the first piston 121 moves.

The cross-sectional shape of the second guide member 126 is obtained by combining a cuboid extending along the side surface of the first piston 121 and a projection 126a arranged on a portion of the cuboid at the outer circumferential side of the first piston 121. The projection 126a functions as an engagement projection engaged with the outer circumference of the first piston 121 that serves as a coupling member. The second C-ring 127 has a shape in which the cross-section is branched into two toward the secondary chamber 3. The second C-ring 127 allows air to flow from the spring compartment 115, which accommodates the compression spring 123 of the primary chamber 102, to the first control compartment 113 of the primary chamber 102. Further, the second C-ring 127 restricts the flow of air from the first control compartment 113 of the primary chamber 102 to the spring compartment 115, which accommodates the compression spring 123. The second guide member 126 is formed from a harder material than the second C-ring 127.

The operation of the spring brake chamber 101 will now be described.

As shown in FIG. 6, when the parking brake is operated and applied, the primary port valve connected to the primary port 11 opens so that compressed air flows out of the primary side. This discharges the compressed air that has been supplied to the first control compartment 113 of the primary chamber 102. Furthermore, when the parking brake is operated and applied, the secondary port valve connected to the secondary port 112 opens so that compressed air flows out of the secondary side. This discharges compressed air from the second control compartment 114 of the secondary chamber 103. The first piston 121 is then moved toward the secondary chamber 103 by the biasing force of the compression spring 123 and fixed at the parking brake application position. Thus, in the spring brake chamber 101, the first push rod 122, which is fixed to the first piston 121, pushes the diaphragm 131 in the secondary chamber 103 toward the rod insertion portion 107. This holds the second piston 132 in a state moved toward the rod insertion portion 107. The parking brake remains applied by the wedge 110 held at the brake lock position with the second piston 132.

As shown in FIG. 7, when the parking brake is released and no longer applied, the primary port valve opens so that compressed air flows into the first control compartment 113, thus supplying the compressed air to the first control compartment 113 in the primary chamber 102. This moves the first piston 121 to the parking brake non-application position away from the secondary chamber 103 with the supplied compressed air. In this case, the movement of the first piston 121 is restricted when the open end of the first piston 121 contacts the piston receiving portion 163. The fixing of the diaphragm 131 and the second piston 132 is thereby released.

When compressed air is not supplied to the first control compartment 113 of the primary chamber 102, and the first piston 121 and the first push rod 122 cannot be moved to the brake non-application position, the release bolt 160 is rotated to engage the engagement portion 160a of the release bolt 160 with the first push rod 122 and move the first piston 121 and the first push rod 122 to the brake non-application position.

When the foot brake is operated, the secondary port valve opens to supply compressed air to the second control compartment 114 of the secondary chamber 103. The diaphragm 131 is then moved toward the rod insertion portion 107 by the supplied compressed air. The diaphragm 131 is then moved toward the rod insertion portion 107, and the second piston 132 is moved toward the rod insertion portion 107. Thus, the wedge 110 is moved to the brake application position with the second piston 132. In the spring brake chamber 101, the brake application amount is changed in accordance with the amount of the compressed air supplied to the secondary chamber 103.

As shown in FIG. 8, when the foot brake is released and no longer applied, the secondary port valve opens so that compressed air flows out of the secondary chamber 103. This discharges the compressed air from the second control compartment 114 in the secondary chamber 103. The diaphragm 131 is moved toward the primary chamber 102 when the compressed air is discharged. The diaphragm 131 is then moved toward the primary chamber 102, and the second piston 132 is moved toward the primary chamber 102. Thus, the wedge 110 is moved away from the brake application position by the second piston 132. This releases the brake, which has been applied.

As shown in FIG. 6, forging is performed so that the spring coupling portion 161 and the threaded portion 162 are formed together integrally at the closed end of the first case 104. Thus, the nut and the spring seat do not need to be separately arranged, and the number of components can be reduced. Furthermore, the piston receiving portion 163 is forged and formed integrally with the inner side surface 104b of the first case 104. Thus, the movement range of the first piston 121 can be restricted without increasing the number of components.

The second embodiment described above has the advantages described below.

(4) The threaded portion 162 is arranged at the closed end of the first case 104, and the closed end of the first case 104 and the threaded portion 162 are integrally formed through forging. The threaded groove of the threaded portion 162 is formed through machining after the forging. Thus, a female thread component that rotates the release bolt 160 does not need to be separately arranged, and the number of components may be reduced. Furthermore, the female thread component and the release bolt do not need to be separated during normal use. This obviates loss of the female thread component and the release bolt. Moreover, the nut does not need to be coupled to the first case 104 through welding or the like, and the threaded portion 162 may be formed just by forming the thread groove 162a at the closed end of the first case 104 during forging. This facilitates the coupling. Since there are no joined portions, the strength of the threaded portion 162 is increased. A forging material having satisfactory shaping property is suitable as the material of the first case 104. In particular, non-iron metal forging material, for example, a material having superior shaping properties such as aluminum alloy, copper alloy such as brass, and iron steel material may be used.

(5) The spring coupling portion, to which the compression spring is attached, is arranged on the closed end of the first case 104, and the spring coupling portion is integrally formed with the closed end through forging. Thus, a spring seat for the compression spring 123 does not need to be separately arranged, and the number of components may be reduced. Furthermore, a spring seat does not need to be attached to the first case 104 through welding or the like, and only needs to be formed through forging. Furthermore, since there are no joining portions, the strength of the spring coupling portion 161 is increased.

(6) The threaded portion 162 is formed in the spring coupling portion 161. Thus, weight is decreased as compared to when the threaded portion 162 and the spring coupling portion 161 are separately arranged in the first case 104.

(7) The piston receiving portion 163 is arranged on the inner side surface 104b of the first case 104, and the piston receiving portion 163 is integrally formed with the inner side surface 104b of the first case 104 through forging. Thus, when the first piston 121 is biased by the compressed air, the movement range of the first piston 121 is determined, the first piston 121 is obviated from moving more than necessary, and the compression spring 123 is obviated from being compressed more than necessary. Furthermore, the movement range of the first piston 121 is restricted without increasing the number of components.

(8) The piston receiving portion 163 is formed over the entire circumference of the inner side surface 104b of the first case 104. This ensures that the first piston 121 is received and restricts movement of the first piston 121. The first piston 121 is also prevented from tilting even if the biasing force generated by the winding of the compression spring 123 is tilted relative to the axial direction.

The second embodiment may be modified as described below to implement the present invention.

In the second embodiment, the piston receiving portion 163 is formed over the entire circumference of the inner side surface 104b of the first case 104. Instead, for example, the piston receiving portion 163 does not have to be continued on the inner side surface 104b of the first case 104 as long as the first piston 121 can be received. In other words, the piston receiving portion 163 may be formed at intervals in the circumferential direction of the inner side surface 104b of the first case 104.

In the second embodiment, the piston receiving portion 163 is formed. However, the structure of the piston receiving portion 163 may be omitted.

In the second embodiment, the threaded portion 162 is formed in the spring coupling portion 161. However, the spring coupling portion 161 and the threaded portion 162 may be separately arranged in the first case 104. The spring coupling portion 161 and the threaded portion 162 may be integrally formed in the first case 104 through forging.

In the second embodiment, the spring coupling portion 161 is integrally formed in the first case 104. However, the spring seat serving as the spring holding portion may be separately arranged in the first case 104.

In the second embodiment, the threaded portion 162 is integrally formed with the first case 104 by forging. However, the threaded portion 162 may be formed as a separate body and integrated with the first case 104 by welding.

A third embodiment of the spring brake chamber will now be described with reference to FIGS. 9 to 14.

Figure 9:
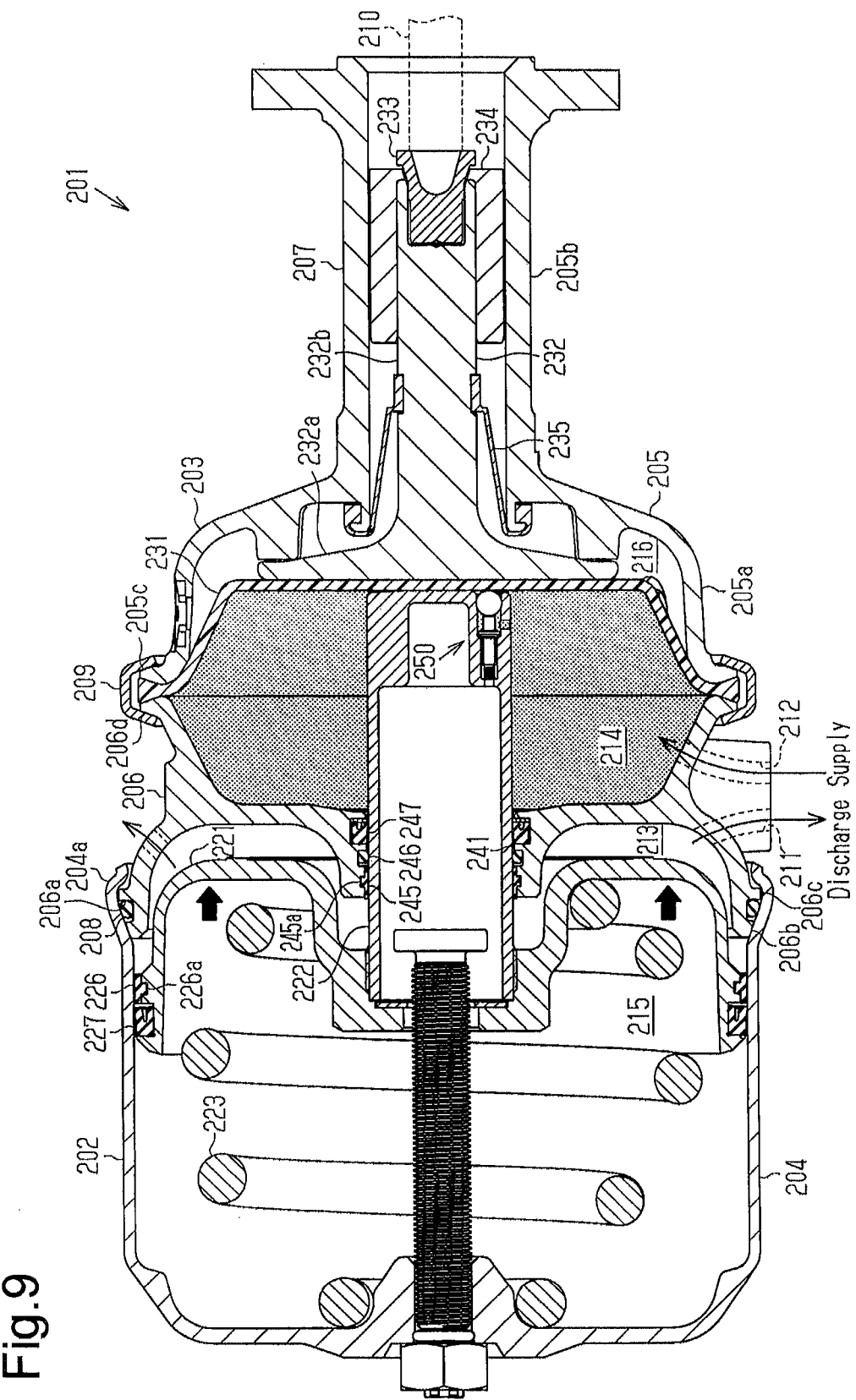
FIG. 9 is a cross-sectional view showing a spring brake chamber according to a third embodiment of the present invention when used with a parking brake.
Figure 10:
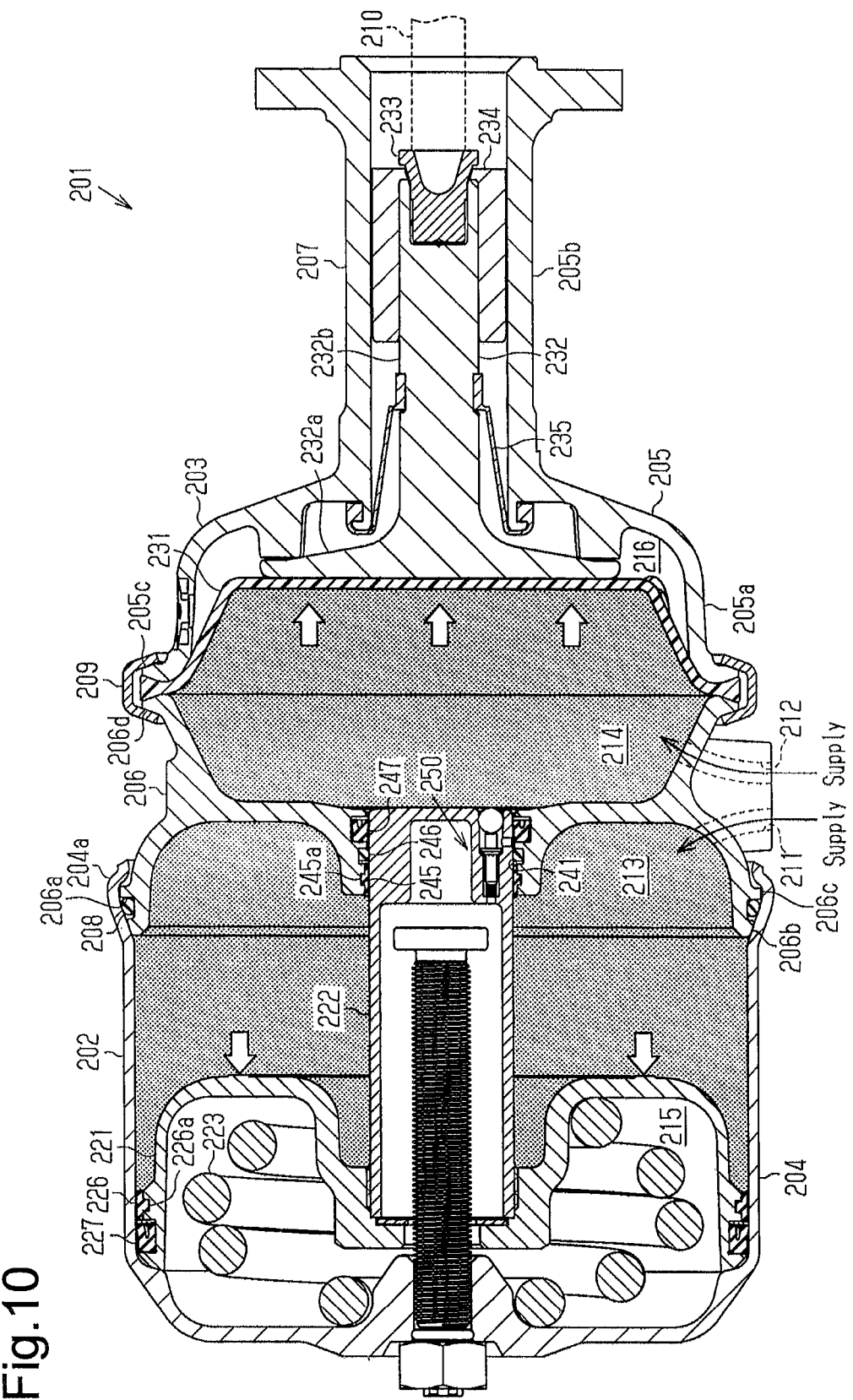
FIG. 10 is a cross-sectional view showing the spring brake chamber when used with a foot brake.
Figure 11:
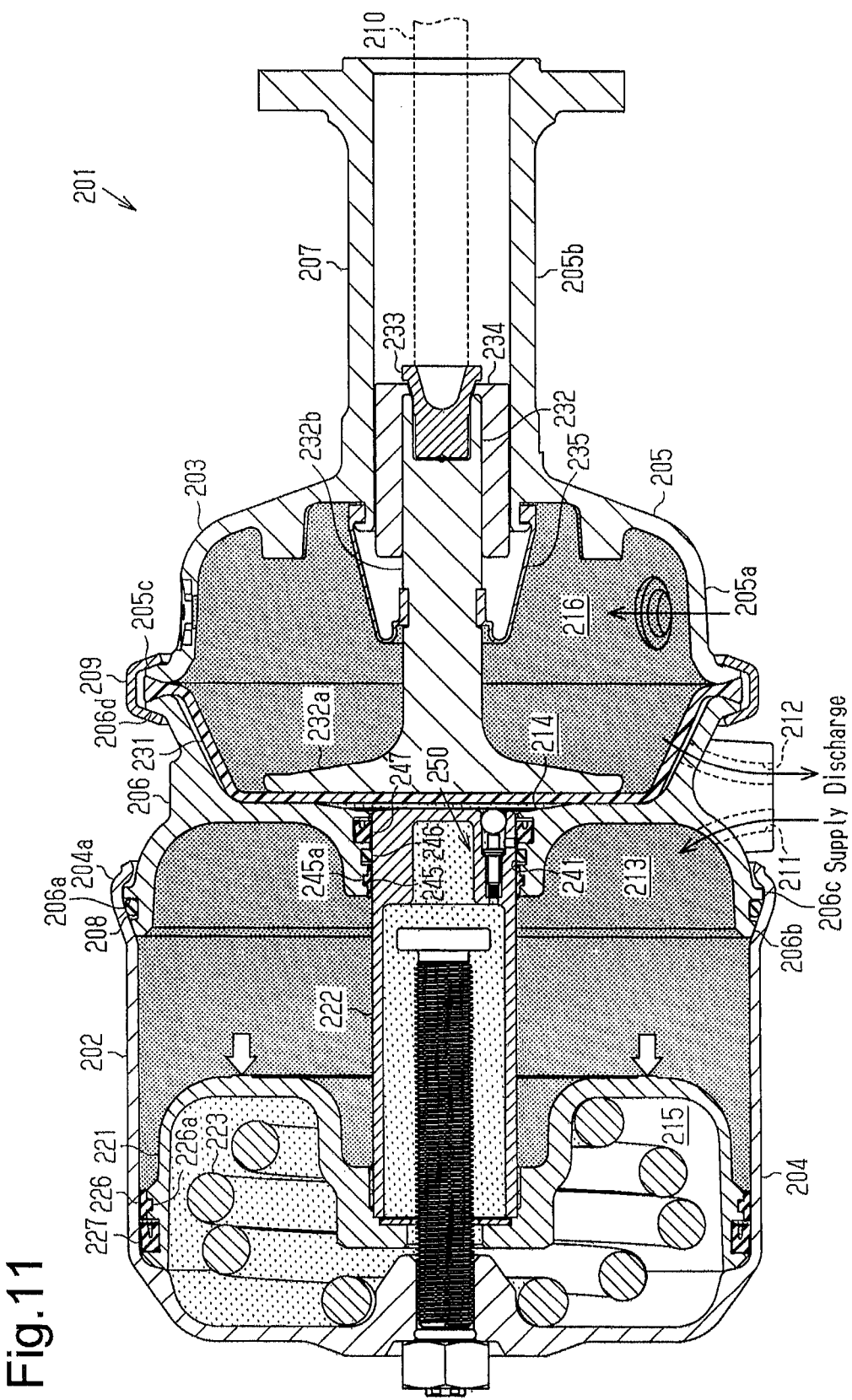
FIG. 11 is a cross-sectional view showing the spring brake chamber when the brake is released.

As shown in FIGS. 9 to 11, a spring brake chamber 201 includes a cylindrical primary chamber 202 (piggyback) and a cylindrical secondary chamber 203 (service chamber), which is coupled to the primary chamber 202. The primary chamber 202 has two closed ends. One end of the secondary chamber 203 is open, and the other end is closed. One end of the secondary chamber 203, that is, the end opposite to the end closer to the primary chamber 202 in the secondary chamber 203 includes a cylindrical rod insertion portion 207 to which a second push rod 233 is inserted.

The spring brake chamber 201 includes a cylindrical first case 204 forming the primary chamber 202, a cylindrical second case 205 forming the secondary chamber 203, and a coupling case 206 serving as a coupling unit that forms the primary chamber 202 in cooperation with the first case 204 and forms the secondary chamber 203 in cooperation with the second case 205. The first case 204 includes an open end, a closed end located at the opposite side of the open end, and an open end portion 204a located proximal to the open end. The second case 205 has two open ends. The coupling case 206 has an I-shaped cross-section, and includes an open end closer to the first case 204, and an open end portion (hereinafter referred to as the open end portion of the coupling case 206) located proximal to the open end. The coupling case 206 forms the primary chamber 202 by closing the first case 204 and forms the secondary chamber 203 by closing the second case 205. The second case 205 includes a large diameter portion 205a forming the secondary chamber 203 and a small diameter portion 205b forming the rod insertion portion 207.

An outer surface of the open end portion of the coupling case 206 includes a recess 206a that receives an O-ring 208 having an O-shaped cross-section and serving as a seal member. The recess 206a is a holding portion formed by two protrusions 206b and 206c, and is formed over the entire circumference of the outer surface of the coupling case 206. The open end portion 204a of the first case 204 is crimped with one end of the coupling case 206 in contact with the open end portion 204a of the first case 204 to connect the first case 204 and the coupling case 206.

A rib 205c is formed at the end closer to the coupling case 206 of the second case 205, and a rib 6d is formed at the end closer to the second case 205 of the coupling case 206. The rib 205c of the second case 205 and the rib 6d of the coupling case 206 are clamped and fixed by a clamp ring 209.

The coupling case 206 includes a primary port 211 through which the compressed air flows to and from the primary chamber 202. A primary port valve (not shown), which controls the outward and inward flow of compressed air, is connected to the primary port 211. The compressed air is supplied from the primary port 211 to the primary chamber 202 by the primary port valve, and the air is discharged from the primary port 211 by the primary port valve.

The coupling case 206 also includes a secondary port 212 through which the compressed air flows to and from the secondary chamber 203. A secondary port valve (not shown) that controls the outward and inward flow of compressed air is connected to the secondary port 212. The compressed air is supplied from the secondary port 212 to the secondary chamber 203 by the secondary port valve, and the air is discharged from the secondary port 212 by the secondary port valve.

A cylindrical first piston 221 is accommodated in the primary chamber 202 so as to be movable in the axial direction. The first piston 221 has an open end and a closed end. The first piston 221 partitions the primary chamber 202 into two compartments, namely, a spring compartment 215 that accommodates a compression spring 223 and a first control compartment 213 that is closer to the coupling case 206. A cylindrical first push rod 222 is fixed to the first piston 221 so as to be movable back and forth in the axial direction integrally with the first piston 221. The first push rod 222 is inserted into a communication hole 241 of the coupling case 206. The first push rod 222 has a hollow interior. A circulating mechanism 250 that circulates the air of the spring compartment 215 to the second control compartment 214 in the secondary chamber 203 is arranged in the first push rod 222. The compression spring 223 in the primary chamber 202 biases the first piston 221 toward the secondary chamber 203.

A diaphragm 231 is arranged in the secondary chamber 203 to partition the secondary chamber 203 into two compartments, namely, the second control compartment 214 at the side of the coupling case 206 and the piston compartment 216 that accommodates the second piston 232. The entire circumference of the diaphragm 231 is held between the rib 205c of the second case 205 and the rib 6d of the coupling case 206, and fixed to the inner wall of the secondary chamber 203. The diaphragm 231, which is a film formed from an elastic material, moves in the secondary chamber 203 when deformed by the compressed air supplied to the secondary chamber 203. The second piston 232 that integrally moves in the rod insertion portion 207 when the diaphragm 231 moves is arranged in the secondary chamber 203. The second piston 232 includes a disk 232a attached to the diaphragm 231 and a bar-shaped portion 232b that moves in the rod insertion portion 207. The end of the bar-shaped portion 232b includes a cylindrical groove hole. The bar-shaped second push rod 233 is inserted into the groove hole. A cylindrical rod guide 234 that guides the second piston 232 so as to be movable in the rod insertion portion 207 is arranged on the distal end of the second piston 232. A cylindrical dust cover 235 is attached to the second piston 232 and the second case 205. One end of the second piston 232 is fixed to the side surface of the second push rod 233, and the other end of the dust cover 235 is fixed to the inner wall of the second case 205.

A wedge 210, which extends the brake shoe of the brake drum, is connected to the groove in the distal end of the second push rod 233. Thus, the spring brake chamber 201 supplies compressed air to at least one of the first control compartment 213 of the primary chamber 202 and the second control compartment 214 of the secondary chamber 203 to drive the wedge 210 and apply the brake.

Figure 12:
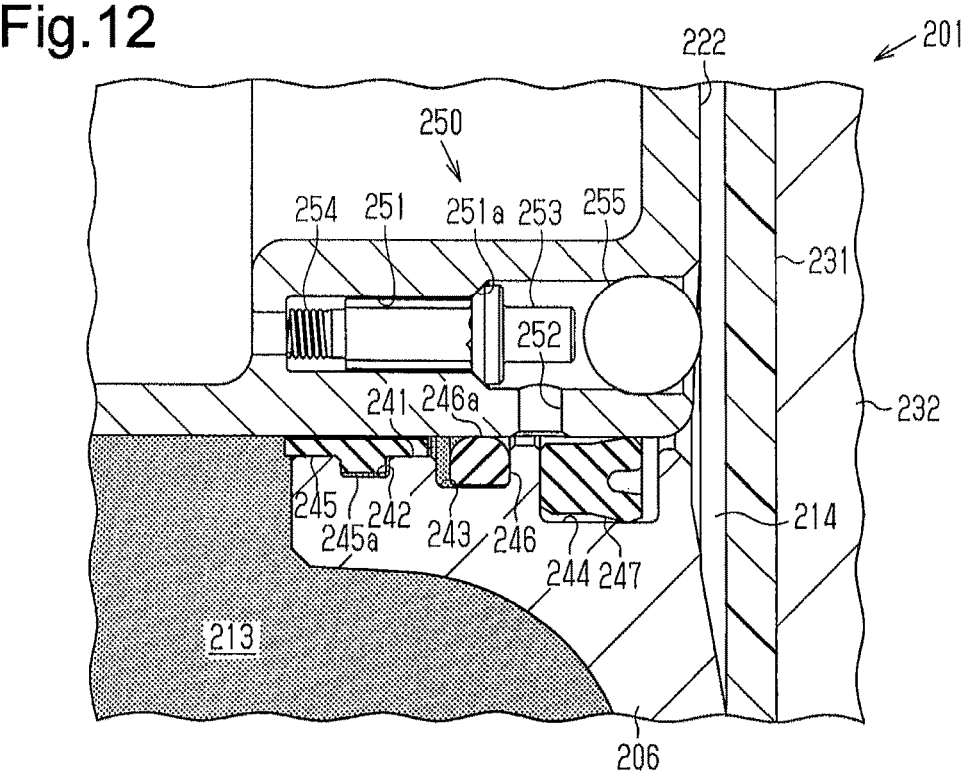
FIG. 12 is an enlarged cross-sectional view of FIG. 10 showing a sealing member and a guide member in a communication hole of the spring brake chamber when used with a foot brake.
Figure 13:
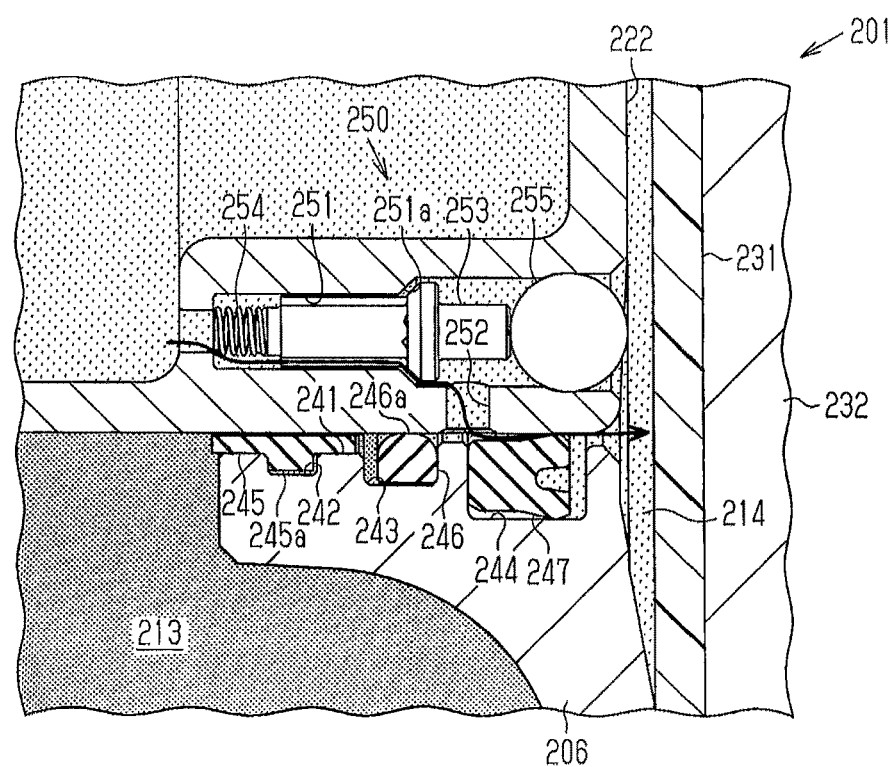
FIG. 13 is an enlarged cross-sectional view of FIG. 11 showing a sealing member and a guide member in the communication hole of the spring brake chamber when the brake is released.

As shown in FIGS. 12 and 13, a first guide member 245, which is formed from a resin and guides the movement of the first push rod 222, a D-ring 246, which is formed from rubber and seals the gap between the wall surface of the communication hole 241 and the first push rod 222, and a first C-ring 247, which is formed from rubber and has a C-shaped cross-section that restricts the flow of air from the second control compartment 214 of the secondary chamber 203 to the first control compartment 213 of the primary chamber 202, are arranged in the inner wall (circumferential wall) defining the communication hole 241 of the coupling case 206 in order from the primary chamber side. The first C-ring 247 has an opening with a C-shaped cross-section that opens toward the secondary chamber 203. The first C-ring 247 corresponds to a first sealing member, and the D-ring 246 corresponds to a third sealing member.

The first guide member 245 is located at the primary chamber side of the first C-ring 247. Specifically, the first guide member 245 is located on a portion of the inner wall of the coupling case 206 closer to the primary chamber 202 than the first C-ring 247 in the axial direction. This minimizes the amount of grease applied to the outer wall of the first push rod 222 that is removed by the inner wall end of the communication hole 241 when the first push rod 222 moves along the inner wall of the communication hole 241 in the coupling case 206. Furthermore, an area where grease is stored is provided between the first guide member 245 and the first C-ring 247 so that the stored greased is re-applied to the entire wall surface when the first push rod 222 moves.

The cross-sectional shape of the first guide member 245 is obtained by combining a cuboid extending along the side surface of the first push rod 222 and a projection 245a arranged on a portion of the cuboid located at an inner wall side of the communication hole 241. The projection 245a functions as an engagement projection engaged with the inner wall of the communication hole 241 that serves as a coupling member. The D-ring 246 has a D-shaped cross-section. The D-ring 246 seals the primary chamber 202 when the D-shaped projection contacts the first push rod 222. Unlike an O-ring, it is easy to check for twisting in the D-ring 246. This obviates twisting when coupling the D-ring 246. The first C-ring 247 has a shape in which the cross-section is branched into two toward the secondary chamber 203. The first C-ring 247 allows air to flow from the spring compartment 215 of the primary chamber 202 to the second control compartment 214 of the secondary chamber 203, and restricts the flow of air from the second control compartment 214 of the secondary chamber 203 to the spring compartment 215 of the primary chamber 202. The first guide member 245 is formed from a harder material than the first C-ring 247.

A first guide accommodation recess 242 for accommodating the projection 245a of the first guide member 245 is formed over the entire circumference on the inner wall of the communication hole 241 of the coupling case 206. A D-ring accommodation recess 243 for accommodating the fl-ring 246 is formed over the entire circumference on the inner wall of the communication hole 241. Only the fl-shaped projection 246a projects from the fl-ring 246 accommodated in the fl-ring accommodation recess 243. Furthermore, a first C-ring accommodation recess 244 for accommodating the first C-ring 247 is formed over the entire circumference on the inner wall of the communication hole 241.

The circulating mechanism 250 is arranged at the distal end of the first push rod 222. More specifically, the distal end portion of the first push rod 222 includes a valve accommodating portion 251 for accommodating a valve. The valve accommodating portion 251 extends through the distal end of the first push rod 222. A through hole 252 that extends through the valve accommodating portion 251 is formed in the distal end of the first push rod 222. The valve accommodating portion 251 includes a valve seat 251a for receiving a circulation piston 253 that functions as a valve. The valve accommodating portion 251 accommodates a spring 254 that biases the circulation piston 253. The valve accommodating portion 251 also accommodates the circulation piston 253 and a ball 255 that holds the circulation piston 253 in the valve accommodating portion 251. When moving the first piston 221 away from the second piston 232 of the secondary chamber 203, the compressed air existing in the first push rod 222 separates the circulation piston 253 from the valve seat 251a. Thus, the compressed air in the first push rod 222 passes through the valve accommodating portion 251 and is discharged out of the through hole 252 to the second control compartment 214 of the secondary chamber 203.

When the parking brake is not applied and the first push rod 222 is located in the primary chamber 202, the through hole 252 of the circulating mechanism 250 is open between the D-ring 246 and the first C-ring 247. If compressed air exists in the first push rod 222 in this state, the compressed air from the valve accommodating portion 251 passes through the through hole 252, closes the branched portion of the first C-ring 247, and passes toward the secondary chamber.

Figure 14:
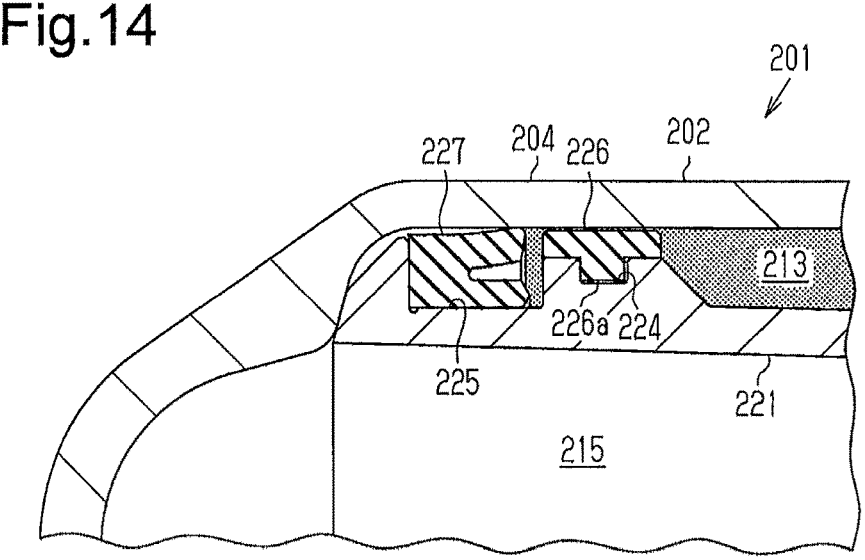
FIG. 14 is an enlarged cross-sectional view showing a sealing member and a guide member at an outer circumference of a first piston of the spring brake chamber.

As shown in FIG. 14, a second guide member 226, which is formed from a resin and guides the movement of the first piston 221, and a second C-ring 227, which is formed from rubber and has a C-shaped cross section that restricts the flow of air from the secondary chamber 203 to the spring compartment 215 accommodating the compression spring 223 in the primary chamber 202, are arranged on the outer circumferential surface of the first piston 221 in order from the secondary chamber side. The second C-ring 227 has an opening having a C-shaped cross-section open toward the secondary chamber 203. The second C-ring 227 corresponds to a second sealing member.

The second guide member 226 is arranged on the secondary chamber side of the second C-ring 227. Specifically, the second guide member 226 is arranged at a portion on the outer circumferential surface of the first piston 221 closer to the secondary chamber 203 than the second C-ring 227 in the axial direction. This minimizes the amount of grease applied to the inner wall of the first case 204 that is removed by the second C-ring 227 when the first piston 221 moves along the inner wall of the first case 204. Furthermore, an area where grease is stored is provided between the second guide member 226 and the second C-ring 227 so that the stored greased is re-applied to the entire wall surface when the first piston 221 moves.

The cross-sectional shape of the second guide member 226 is obtained by combining a cuboid extending along the side surface of the first piston 221 and a projection 226a arranged on a portion of the cuboid at the outer circumferential side of the first piston 221. The projection 226a functions as an engagement projection engaged with the outer circumference of the first piston 221 that serves as a coupling member. The second C-ring 227 has a shape in which the cross-section is branched into two toward the secondary chamber 203. The second C-ring 227 allows air to flow from the spring compartment 215 accommodating the compression spring 223 in the primary chamber 202 to the first control compartment 213 in the primary chamber 202, and restricts the flow of air from the first control compartment 213 of the primary chamber 202 to the spring compartment 215 accommodating the compression spring 223. The second guide member 226 is formed from a harder material than the second C-ring 227.

A second guide accommodation recess 224 for accommodating the projection 226a of the second guide member 226 is formed over the entire circumference on the outer circumference of the first piston 221. A second C-ring accommodation recess 225 for accommodating the second C-ring 227 is formed over the entire circumference on the outer circumference of the first piston 221. The second guide member 226 and the second C-ring 227 move with the first piston 221.

The operation of the spring brake chamber will now be described.

As shown in FIG. 9, when the parking brake is operated and applied, the primary port valve connected to the primary port 211 opens so that compressed air flows out of the primary side. This discharges the compressed air that has been supplied to the first control compartment 213 in the primary chamber 202. Furthermore, when the parking brake is operated and applied, the secondary port valve connected to the secondary port 212 opens so that compressed air flows out of the secondary side. This discharges the compressed air out of the second control compartment 214 in the secondary chamber 203. As a result, the first piston 221 is moved toward the secondary chamber 203 by the biasing force of the compression spring 223 and fixed at the parking brake application position. The spring brake chamber 201 is thus in a state in which the first push rod 222, which is fixed to the first piston 221, pushes the diaphragm 231 in the secondary chamber 203 toward the rod insertion portion 207. The second piston 232 is thus held in the state moved toward the rod insertion portion 207. The second piston 232 holds the wedge 210 at the brake lock position and keeps the parking brake applied.

As shown in FIG. 10, when the parking brake is released and no longer operated, the primary port valve opens so that compressed air flows into the first control compartment 213. This supplies compressed air to the first control compartment 213 in the primary chamber 202. The supplied compressed air moves the first piston 221 toward the primary chamber and to the parking brake non-application position. This releases the diaphragm 231 and the second piston 232, which have been fixed to each other.

When the foot brake is applied, the secondary port valve opens to supply compressed air to the second control compartment 214 of the secondary chamber 203. The supplied compressed air moves the diaphragm 231 toward the rod insertion portion 207. The diaphragm 231 is then moved toward the rod'insertion portion 207, and the second piston 232 is moved toward the rod insertion portion 207. Thus, the wedge 210 is moved to the brake application position with the second piston 232. In the spring brake chamber 201, the brake application amount is changed in accordance with the amount of compressed air supplied to the secondary chamber 203.

As shown in FIG. 11, when the foot brake is released and no longer applied, the secondary port valve opens so that the compressed air of the secondary chamber 203 flows out. This discharges the compressed air from the second control compartment 214 to the secondary chamber 203. The diaphragm 231 is moved toward the primary chamber 202 when the compressed air is discharged. The diaphragm 231 is then moved toward the primary chamber 202, and the second piston 232 is moved toward the primary chamber 202. Thus, the brake, which has been applied, is released by moving the wedge 210 away from the brake application position with the second piston 232.

In the spring brake chamber 201 of the third embodiment, the first C-ring 247 and the D-ring 246, which serve as the sealing members, and the first guide member 245 are arranged between the first push rod 222 and the communication hole 241. Furthermore, the second guide member 226 and the second C-ring 227, which serve as the sealing members, are arranged between the first piston 221 and the first case 204. A conventional spring brake chamber employs a member in which the guide member and the sealing member are integrated. Thus, it is difficult to obtain the required performance of the guide member and the required performance of the sealing member at the same time. In the third embodiment, the guide member and the sealing member can each have the required performances since the guide member and the sealing member are separate members.

Furthermore, the performances can be maintained and the repairing costs can be reduced since replacement of only worn members is possible.

Moreover, in the spring brake chamber 201 of the third embodiment, the first guide member 245 is formed from a harder material than the first C-ring 247, and the second guide member 226 is formed from a harder material than the second C-ring 227. Thus, even if lateral force relative to the axial direction of the primary chamber 202 acts on the first piston 221 due to the winding of the compression spring 223, the improved durability of the first guide member 245 reduces deterioration of the first C-ring 247 and allows for smooth movement of the first push rod 222 and the first piston 221.

The third embodiment has the advantages described below.

(9) The first C-ring 247 and the first guide member 245 are arranged between the first push rod 222 and the inner wall of the communication hole 241. Thus, the first C-ring 247 having a sealing function and the first guide member 245 having a guiding function are formed as separate members. This allows each member to have the desired performance. The first guide member 245 is formed from a harder material than the first C-ring 247. Thus, even if lateral force relative to the axial direction of the primary chamber 202 acts on the first piston 221 due to the winding of the compression spring 223, the improved durability of the first piston 221 reduces deterioration and smoothly moves the first push rod 222 by smoothly moving the first piston 221.

(10) The second C-ring 227 and the second guide member 226 are arranged between the first piston 221 and the inner wall of the communication hole 241. Thus, the second C-ring 227 having the sealing function and the second guide member 226 having the guide function are formed as separate members. This allows each member to have the desired performance. The second guide member 226 is formed from a harder material than the second C-ring 227. Thus, even if lateral force relative to the axial direction of the primary chamber 202 acts on the first piston 221 due to the winding of the compression spring 223, the improved durability of the second guide member 226 reduces deterioration of the second C-ring 227 and smoothly moves the first piston 221.

(11) The inner wall (circumferential wall) of the communication hole 241 functions as the coupling member, and the projection 245a is arranged at the portion facing the coupling member in the first guide member 245. The projection 245a is engaged with the coupling member. Therefore, the engagement portion does not need to be arranged on a sliding surface side, and a large sliding surface of the first guide member 245 may be obtained. For example, the first guide member 245 arranged in the inner wall of the communication hole 241 obtains a sliding surface with the inner wall of the communication hole 241. The outer circumferential surface of the first piston 221 functions as the coupling member, and the projection 226a is arranged at the portion facing the coupling member in the second guide member 226. Therefore, there is no need for an engagement portion at the sliding surface side, and a large sliding surface for the second guide member 226 is obtained.

(12) The first guide member 245 is arranged closer to the primary chamber 202 than the first C-ring 247, and the second guide member 226 is arranged closer to the secondary chamber 203 than the second C-ring 227. This minimizes the amount of grease applied to the inner wall of the primary chamber 202 that is removed by the first C-ring 247 when the first piston 221 moves along the inner wall of the primary chamber 202. This also minimizes the amount of grease applied to the inner wall of the communication hole 241 that is removed by the second C-ring 227 when the first push rod 222 moves along the inner wall of the communication hole 241.

(13) The D-ring 246 is arranged between the first push rod 222 and the inner wall of the communication hole 241. This ensures sealing of the space between the first push rod 222 and the communication hole 241.

(14) The D-shaped projection 246a of the D-ring 246 contacts the first push rod 222. This ensures sealing of the space between the first push rod 222 and the inner wall of the communication hole 241. The location of contact of the D-ring 246 is fixed. This obviates twisting of the D-ring 246.

The third embodiment may be modified as described below to implement the present invention.

Figure 15:
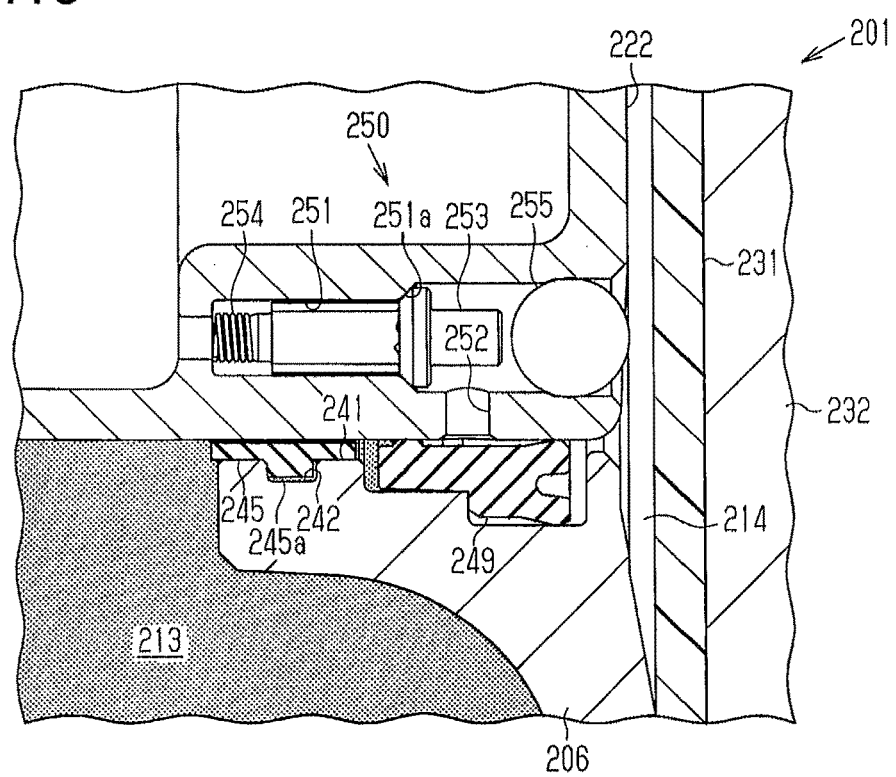
FIG. 15 is an enlarged cross-sectional view showing a sealing member and a guide member in a communication hole of a spring brake chamber in another example.

In the third embodiment, the first guide member 245, the D-ring 246, and the first C-ring 247 are arranged between the first piston 221 and the inner wall of the communication hole 241. Instead, for example, the D-ring 246 and the first C-ring 247 may be an integrated member. In other words, as shown in FIG. 15, the first guide member 245 and the sealing member 249 are arranged between the first piston 221 and the inner wall of the communication hole 241. The sealing member 249 functions as the D-ring 246 and the first C-ring 247. Thus, the number of components may be reduced while each of the first guide member 245 and the sealing member 249 provided with the desired performance.

In the third embodiment, the D-ring 246 serving as the third sealing member is arranged between the first piston 221 and the inner wall of the communication hole 241. Instead, the sealing member having a different shape such as an O-ring may be used as the third sealing member.

In the third embodiment, the D-ring 246 serving as the third sealing member may be omitted.

In the third embodiment, the first guide member 245 is arranged on the primary chamber side of the first C-ring 247, and the second guide member 226 is arranged on the secondary chamber side of the second C-ring 227. However, if the influence on the movement of the first piston 221 is small, the first C-ring 247 may be arranged on the primary chamber side of the first guide member 245 and the second C-ring 227 may be arranged on the secondary chamber side of the second guide member 226.

In the third embodiment, the engagement projection is formed at portions of the first guide member 245 and the second guide member 226 facing the coupling member. Instead, for example, the portion engaged with the coupling member may be formed at other portions as long as a slide area of the first guide member 245 and the second guide member 226 can be ensured.

In the third embodiment, the second C-ring 227 and the second guide member 226 are arranged between the first piston 221 and the inner wall of the communication hole 241. Instead, for example, the sealing member and the guide member between the first piston 221 and the inner wall of the communication hole 241 can be omitted as long as the first piston 221 smoothly moves.

The invention claimed is:

1. A spring brake chamber comprising:
 a cylindrical first case forming a primary chamber, wherein the first case includes an open end, a closed end located at a side opposite to the open end, and an open end portion located proximal to the open end, and the open end portion includes a tapered outer positioning portion having a diameter that increases toward the open end;

a cylindrical second case forming a secondary chamber;
a coupling case that couples the first case and the second case, wherein the coupling case includes a coupling case open end closer to the first case and a coupling case open end portion located proximal to the coupling case open end, and the coupling case open end portion includes a tapered inner positioning portion having a diameter that decreases toward the coupling case open end, and
a seal member, which forms a shaft seal structure, and a holding portion, which holds the seal member,
wherein the seal member and the holding portion are arranged between the inner positioning portion and the outer positioning portion,
wherein the holding portion is a recess formed by two protrusions,
wherein the first case is positioned relative to the coupling case by attaching the outer positioning portion to an outer side of the inner positioning portion,
wherein a distal end portion of the outer positioning portion is crimped to attach the outer positioning portion to the outer side of the inner positioning portion and couple the outer positioning portion to the inner positioning portion,
wherein the two protrusions include a first protrusion and a second protrusion, the second protrusion arranged closer to the open end of the first case than the first protrusion,
wherein the first protrusion contacts with the outer positioning portion, and
wherein the second protrusion is spaced apart from the outer positioning portion to form a clearance between the second protrusion and the outer positioning portion.

2. A spring brake chamber comprising:
a primary chamber including a spring compartment;
a first piston accommodated in the primary chamber;
a compression spring accommodated in the spring compartment and having a biasing force that biases the first piston;
a secondary chamber including a second control compartment;
a second piston accommodated in the secondary chamber and moved by a supply of compressed air;
a coupling unit that couples the primary chamber and the secondary chamber, wherein the coupling unit includes an inner circumferential surface that defines a communication hole, wherein the inner circumferential surface includes a groove that is depressed in a direction away from the inner circumferential surface;
a push rod arranged in the first piston and inserted through the communication hole, wherein the push rod holds the second piston when biased by the compression spring, wherein the push rod includes a through hole formed in a distal end of the push rod and communicated to the spring compartment of the primary chamber;
a one-way seal arranged between the push rod and the inner circumferential surface of the communication hole, wherein the one-way seal is located in the groove depressed from the inner circumferential surface of the communication hole;
a first guide member arranged proximal to the one-way seal to guide movement of the push rod; and
a two-way seal arranged between the push rod and the inner circumferential surface of the communication hole adjacent the one-way seal,
wherein the first guide member is formed from a harder material than the one-way seal,
wherein the first guide member is located only at a position between the one-way seal and the first piston in an axial direction of the primary chamber,
wherein the one-way seal is configured to allow air to flow in a direction from the spring compartment of the primary chamber to the second control compartment of the secondary chamber, and to restrict the flow of air in the opposite direction from the second control compartment of the secondary chamber to the spring compartment of the primary chamber,
wherein the two-way seal is configured to seal a gap between the inner circumferential surface of the communication hole and the push rod to seal the primary chamber,
wherein the through hole of the push rod is positioned to open between the one-way seal and the two-way seal when a parking brake is not operated to permit the air to flow through the through-hole from the spring compartment of the primary chamber to the second control compartment of the secondary chamber via the one-way seal, and
wherein the one-way seal and the two-way seal are either separate members or integrally formed as a single member.

3. The spring brake chamber according to claim 2, further comprising: a seal member arranged between the first piston and an inner wall of the primary chamber; and a second guide member arranged proximal to the seal member to guide movement of the first piston, wherein the second guide member is formed from a harder material than the seal member.

4. The spring brake chamber according to claim 2, wherein the inner circumferential surface of the communication hole functions as a coupling member; and a portion of the guide member facing the coupling member includes an engagement projection, and the engagement projection is engaged with the coupling member.

5. The spring brake chamber according to claim 2, wherein the first guide member is arranged closer to the primary chamber than the one-way seal.

6. The spring brake chamber according to claim 3, wherein the second guide member is arranged closer to the secondary chamber than the seal member.

7. The spring brake chamber according to claim 2, wherein the two-way seal is a D-shaped D ring including a projection; and wherein the projection contacts the push rod.

8. A spring brake chamber comprising:
a primary chamber including a spring compartment;
a first piston accommodated in the primary chamber;
a compression spring accommodated in the spring compartment and having a biasing force that biases the first piston;
a secondary chamber including a second control compartment;
a second piston accommodated in the secondary chamber and moved by a supply of compressed air;
a coupling unit that couples the primary chamber and the secondary chamber, wherein the coupling unit includes an inner circumferential surface that defines a communication hole, wherein the inner circumferential surface includes a groove that is depressed in a direction away from the inner circumferential surface;
a push rod arranged in the first piston and inserted through the communication hole, wherein the push rod holds the second piston when biased by the compression spring, wherein the push rod includes a through hole formed in a distal end of the push rod and communicated to the spring compartment of the primary chamber;
a one-way seal arranged between the push rod and the inner circumferential surface of the communication hole, wherein the one-way seal is located in the groove depressed from the inner circumferential surface of the communication hole;
a first guide member arranged proximal to the one-way seal to guide movement of the push rod;
a seal member arranged between the first piston and an inner wall of the primary chamber;
a second guide member arranged proximal to the seal member to guide movement of the first piston; and
a two-way seal arranged between the push rod and the inner circumferential surface of the communication hole adjacent the one-way seal,
wherein the first guide member is formed from a harder material than the way seal,
wherein the second guide member is formed from a harder material than the seal member,
wherein the first guide member is located only at a position between the one-way seal and the first piston in an axial direction of the primary chamber,
wherein the one-way seal is configured to allow air to flow in a direction from the spring compartment of the primary chamber to the second control compartment of the secondary chamber, and to restrict the flow of air in the opposite direction from the second control compartment of the secondary chamber to the spring compartment of the primary chamber,
wherein the two-way seal is configured to seal a gap between the inner circumferential surface of the communication hole and the push rod to seal the primary chamber,
wherein the through hole of the push rod is positioned to open between the one-way seal and the two-way seal when a parking brake is not operated to permit the air to flow through the through-hole from the spring compartment of the primary chamber to the second control compartment of the secondary chamber via the one-way seal, and
wherein the one-way seal and the two-way seal are either separate members or integrally formed as a single member.

9. The spring brake chamber according to claim 8, wherein the inner circumferential surface of the communication hole functions as a coupling member; and a portion of the guide member facing the coupling member includes an engagement projection, and the engagement projection is engaged with the coupling member.

10. The spring brake chamber according to claim 8, wherein the first guide member is arranged closer to the primary chamber than the one-way seal.

11. The spring brake chamber according to claim 8, wherein the second guide member is arranged closer to the secondary chamber than the seal member.

12. The spring brake chamber according to claim 8, wherein the two-way seal is a D-shaped D ring including a projection; and wherein the projection contacts the push rod.

13. The spring brake chamber according to claim 8, wherein the second guide member is located only at a position between the seal member and the coupling unit in the axial direction of the primary chamber.

14. The spring brake chamber according to claim 2, wherein the first guide member is the only guide member guiding movement of the push rod.

15. The spring brake chamber according to claim 8, wherein the first guide member is the only guide member guiding movement of the push rod.

16. The spring brake chamber according to claim 2, wherein the first piston partitions the primary chamber into the spring compartment and a first control compartment,
wherein the spring brake chamber further comprising a diaphragm arranged in the secondary chamber, and
wherein the diaphragm partitions the secondary chamber into the second control compartment located at a side of the coupling unit and a piston compartment that accommodates the second piston.

17. The spring brake chamber according to claim 8, wherein the first piston partitions the primary chamber into the spring compartment and a first control compartment,
wherein the spring brake chamber further comprising a diaphragm arranged in the secondary chamber, and
wherein the diaphragm partitions the secondary chamber into the second control compartment located at a side of the coupling unit and a piston compartment that accommodates the second piston.

* * * * *